US010892854B2

(12) United States Patent
Tang

(10) Patent No.: US 10,892,854 B2
(45) Date of Patent: Jan. 12, 2021

(54) METHOD, TERMINAL DEVICE AND BASE STATION FOR TRANSMITTING FEEDBACK INFORMATION

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 21 days.

(21) Appl. No.: 16/251,706

(22) Filed: Jan. 18, 2019

(65) Prior Publication Data

US 2019/0190659 A1 Jun. 20, 2019

Related U.S. Application Data

(63) Continuation of application No. PCT/CN2016/091964, filed on Jul. 27, 2016.

(51) Int. Cl.
*H04L 1/16* (2006.01)
*H04L 5/00* (2006.01)
*H04L 1/18* (2006.01)

(52) U.S. Cl.
CPC .......... *H04L 1/1657* (2013.01); *H04L 1/1635* (2013.01); *H04L 1/1854* (2013.01); *H04L 5/0005* (2013.01); *H04L 5/0055* (2013.01)

(58) Field of Classification Search
CPC ... H04L 1/1657; H04L 1/1854; H04L 5/0005; H04L 1/1635; H04L 5/0055;
(Continued)

(56) References Cited

U.S. PATENT DOCUMENTS

2011/0085496 A1 4/2011 Zhang
2012/0051332 A1* 3/2012 Hole ................. H04W 72/1257
370/336
(Continued)

FOREIGN PATENT DOCUMENTS

CN 101127587 A 2/2008
CN 102055571 A 5/2011
(Continued)

OTHER PUBLICATIONS

The Extended European Search Report dated Jun. 3, 2019; Appln. No. 16910059.1.
(Continued)

Primary Examiner — Thien Nguyen

(57) ABSTRACT

The present disclosure provides a method, a terminal device and a base station for transmitting feedback information, the method includes: receiving, by the terminal device, the plurality of data packets transmitted by the base station; if the terminal device determines that there is an unsuccessfully received data packet in the plurality of data packets, transmitting, by the terminal device, first feedback information to the base station, where the first feedback information is configured for feeding back for the receiving status of the plurality of data packets, and the first feedback information includes only negative acknowledgement (NACK) information for negatively acknowledging the unsuccessfully received data packet. Therefore the terminal device does not need to transmit specialized acknowledgement information to the base station for a successfully received data packet, thereby avoiding a waste of resources and improving the throughput of the communication system.

14 Claims, 8 Drawing Sheets

(58) Field of Classification Search
CPC ... H04L 5/0092; H04L 1/1848; H04L 1/1628; H04W 72/14
See application file for complete search history.

(56) References Cited

U.S. PATENT DOCUMENTS

| | | | | |
|---|---|---|---|---|
| 2014/0321422 | A1* | 10/2014 | Choi | H04L 1/1861 370/330 |
| 2015/0146607 | A1* | 5/2015 | Abraham | H04L 1/1685 370/312 |
| 2017/0325277 | A1 | 11/2017 | Fujishiro et al. | |

FOREIGN PATENT DOCUMENTS

| | | |
|---|---|---|
| CN | 102144414 A | 8/2011 |
| CN | 102148672 A | 8/2011 |
| CN | 103181233 A | 6/2013 |
| CN | 105099628 A | 11/2015 |
| CN | 105337711 A | 2/2016 |
| CN | 105765893 A | 7/2016 |
| JP | 2011517191 A | 5/2011 |
| JP | 2012502561 A | 1/2012 |
| JP | 2016540434 A | 12/2016 |
| WO | 2009/008635 A1 | 1/2009 |
| WO | 2009096305 A1 | 8/2009 |
| WO | 2015080840 A1 | 6/2015 |
| WO | 2016/121567 A1 | 8/2016 |

OTHER PUBLICATIONS

The First Offie Action of corresponding European application No. 16910059.1, dated Mar. 30, 2020.
The First Office Action of corresponding Chinese application No. 201680087365.X, dated Jun. 24, 2020.
The First Office Action of corresponding Indian application No. 201917005849, dated Aug. 27, 2020.
The First Office Action of corresponding Japanese application No. 2019-500668, dated Sep. 15, 2020.

* cited by examiner

METHOD, TERMINAL DEVICE AND BASE STATION FOR TRANSMITTING FEEDBACK INFORMATION

CROSS-REFERENCE TO RELATED APPLICATIONS

This application is a continuation of International Application No. PCT/CN2016/091964, filed on Jul. 27, 2016, which is incorporated herein by reference in their entirety.

TECHNICAL FIELD

Embodiments of the present disclosure relate to the field of communications, and more particularly, to a method, a terminal device, and a base station for transmitting feedback information.

BACKGROUND

In the Long Term Evolution (LTE) network, a feedback from a receiving end is necessary for the data packet transmitted by the transmitting end at the physical layer. After receiving the data packet correctly, the receiving end feeds back an Acknowledgement (ACK) frame to the transmitting end. The transmitting end continues to transmit a new data packet after receiving the ACK frame transmitted by the receiving end; when the receiving end finds that the data packet is received incorrectly, it feeds back a Negative Acknowledgment (NACK) frame to the transmitting end. When the transmitting end receives the NACK frame, it retransmits the data packet which is incorrectly received, and transmits a new data packet after the retransmitted data packet is received by the receiving end.

Future communication systems need to support very high transmission rates and have better channel conditions. The feedback method in the prior art can lead to unnecessary waste of resources and reduce the throughput of the communication system.

SUMMARY

The present application provides a method, a terminal device, and a base station for transmitting feedback information, which can avoid waste of resources and improve throughput of the communication system.

A first aspect provides a method for transmitting feedback information, including: receiving, by a terminal device, a plurality of data packets transmitted by a base station; if the terminal device determines that there is an unsuccessfully received data packet in the plurality of data packets, transmitting, by the terminal device, first feedback information to the base station, where the first feedback information is configured for feeding back receiving status of the plurality of data packets, and the first feedback information includes only negative acknowledgement (NACK) information for negatively acknowledging the unsuccessfully received data packet.

Therefore, according to the method for transmitting feedback information in an embodiment of the present application, the terminal device transmits feedback information to the base station when determining that there is an unsuccessfully received data packet in the plurality of data packets transmitted by the base station, and the feedback information includes only NACK information for negatively acknowledging unsuccessfully received packets. Therefore, the terminal device does not need to transmit specialized acknowledgement information to the base station for a successfully received data packet, thereby avoiding a waste of resources and improving the throughput of the communication system.

In conjunction with the first aspect, in a first possible implementation of the first aspect, the NACK information carries the identification information, where the identification information is used by the base station to determine, according to the identification information, the unsuccessfully received data packet; where the identification information is index information of a radio frame and a subframe that are occupied by the terminal device when receiving the unsuccessfully received data packet, or the identification information is a serial number of the unsuccessfully received data packet.

In conjunction with the first aspect or the first possible implementation of the first aspect, in a second possible implementation of the first aspect, before the receiving, by a terminal device, a plurality of data packets transmitted by a base station, the method further includes: receiving, by the terminal device, first information transmitted by the base station, where the first information is configured for indicating a first time-frequency resource allocated by the base station to the terminal device for transmitting feedback information; where the transmitting, by the terminal device, the first feedback information to the base station, includes: transmitting, by the terminal device, the first feedback information to the base station on the first time-frequency resource.

In conjunction with the second possible implementation of the first aspect, in a third possible implementation of the first aspect, the method further includes: receiving, by the terminal device, second information transmitted by the base station, where the second information is configured for indicating the terminal device to feed back receiving status of the plurality of data packets to the base station using a first manner or a second manner when each data packet in the plurality of data packets is successfully received; where the first manner is to transmit second feedback information to the base station on the first time-frequency resource, where the second feedback information includes acknowledgement (ACK) information, and the ACK information is configured for indicating that each data packet in the plurality of data packets is successfully received by the terminal device; the second manner is to not transmit feedback information to the base station on the first time-frequency resource.

In conjunction with the second or third possible implementation of the first aspect, in a fourth possible implementation of the first aspect, the first time-frequency resource is a plurality of time-frequency resources, and a time interval between two adjacent time-frequency resources is a first preset value.

When the base station allocates to the terminal device a time-frequency resource for transmitting the feedback information, the base station allocates a periodic time-frequency resource, thereby reducing a number of signaling in the communication system and improving resource utilization.

In conjunction with the first aspect or the first possible implementation of the first aspect, in a fifth possible implementation of the first aspect, the method further includes: transmitting, by the terminal device, third information to the base station, where the third information is configured for requesting the base station to allocate, to the terminal device, time-frequency resource for transmitting the first feedback information; where the transmitting, by the terminal device, first feedback information to the base station includes: if the terminal device receives fourth information transmitted by the base station in a preset time period from a time when the third information is transmitted to the base station, transmitting, by the terminal device, the first feedback information to the base station on the second time-frequency resource indicated by the fourth information.

The terminal device applies to the base station for the time-frequency resource for transmitting the feedback information only when the feedback information needs to be transmitted, so that the base station may not necessarily configure the time-frequency resource for transmitting the feedback information for the terminal device in advance, and can avoid a waste of resources.

In conjunction with the fifth possible implementation of the first aspect, in a sixth possible implementation of the first aspect, the method further includes: if the terminal device does not receive the fourth information in the preset time period from a time when the third information is transmitted to the base station, transmitting, by the terminal device, the first feedback information to the base station on a third time-frequency resource; where the third time-frequency resource is a time-frequency resource allocated by the base station, for transmitting feedback information, to the terminal device before the terminal device receives the plurality of data packets transmitted by the base station, where the third time-frequency resource is a plurality of time-frequency resources, and the time interval between two adjacent time-frequency resources of the plurality of time-frequency resources is a second preset value.

When the terminal device needs to transmit the feedback information to the base station, the terminal device may first apply to the base station for the time-frequency resource for transmitting the feedback information. If the application succeeds, the terminal device transmits the feedback information to the base station on the applied time-frequency resource, and if the application fails, the terminal device transmits feedback information to the base station on the time-frequency resource allocated by the base station in advance, thereby improving the performance of the communication system.

In conjunction with the fifth or the sixth possible implementation of the first aspect, in a seventh possible implementation of the first aspect, the third information is uplink scheduling request (SR) information, and the fourth information is an uplink grant (UL Grant) signaling; alternatively the thirdly information is uplink scheduling request (SR) information, and the fourth information is a radio resource control (RRC) signaling.

In conjunction with the first aspect, or any possible implementation of the first to the seventh possible implementations of the first aspect, in an eighth possible implementation of the first aspect, Before the terminal device receives the plurality of data packets transmitted by the base station, the method further includes: receiving, by the terminal device, fifth information transmitted by the base station, where the fifth information is configured for indicating a feedback manner in which the terminal device feeds back receiving status of the plurality of data packets; where the transmitting, by the terminal device, first feedback information to the base station includes: when the fifth information indicates the terminal device to adopt a target feedback manner, transmitting, by the terminal device, the first feedback information to the base station, where the target feedback manner is that the terminal device transmits, to the base station, the feedback information including only the NACK information for negatively acknowledging the unsuccessfully received data packet in case that the terminal device determines that there is unsuccessfully received data packet.

The terminal device adopts a feedback manner indicated by the base station to feed back the receiving status of the plurality of data packets, thereby adopting a more appropriate feedback manner, which can avoid a waste of resources and improve the performance of the communication system.

In conjunction with the eighth possible implementation of the first aspect, in a ninth possible implementation of the first aspect, the receiving, by the terminal device, fifth information transmitted by the base station includes: receiving, by the terminal device, an uplink grant (UL Grant) signaling transmitted by the base station, where the UL grant signaling carries the fifth information; or, receiving, by the terminal device, a downlink grant (DL Grant) signaling transmitted by the base station, where the DL grant signaling carries the fifth information; or, receiving, by the terminal device, a radio resource control (RRC) signaling transmitted by the base station, where the RRC signaling carries the fifth information.

A second aspect provides a method for transmitting feedback information, including: receiving, by a terminal device, a data packet transmitted by a base station; if the terminal device determines that the data packet is unsuccessfully received, transmitting, by the terminal device, first information to the base station, where the first information is configured for requesting the base station to allocate, to the terminal device, a time-frequency resource for transmitting negative acknowledgement (NACK) information, and the NACK information is configured for negatively acknowledging the data packet.

Therefore, according to the method for transmitting feedback information in an embodiment of the present application, when determining that the data packet transmitted by the base station is not successfully received, the terminal device applies to the base station for a time-frequency resource for transmitting NACK information for negatively acknowledging the data packet. Therefore, the base station may not need to allocate the time-frequency resource, for transmitting the NACK information, to the terminal device in advance, and the terminal device does not need to conduct a feedback for the successfully received data packet, thereby avoiding a waste of resources and improving the throughput of the communication system.

In conjunction with the second aspect, in a first possible implementation of the second aspect, the method further includes: if the terminal device receives second information transmitted by the base station in a preset time period from a time when the first information is transmitted to the base station, transmitting, by the terminal device, the NACK information to the base station on the first time-frequency resource indicated by the second information.

In conjunction with the first possible implementation of the second aspect, in a second possible implementation of the second aspect, the method further includes: if the terminal device does not receive the second information in a preset time period from a time when the first information is transmitted to the base station, transmitting, by the terminal device, the NACK information to the base station on a second time-frequency resource; where the second time-frequency resource is a time-frequency resource allocated by the base station, for transmitting feedback information, to the terminal device before the terminal device receives the data packet, where the second time-frequency resource is a plurality of time-frequency resources, and the time interval between two adjacent time-frequency resources in the plurality of time-frequency resources is a preset value.

In conjunction with the second aspect, or any possible implementation of the first or the second possible implementation of the first aspect, in a third possible implementation of the second aspect, the first information is uplink scheduling request (SR) information, and the second information is an uplink grant (UL Grant) signaling; alternatively the first information is uplink scheduling request (SR) information, and the second information is a radio resource control (RRC) signaling.

A third aspect provides a method for transmitting feedback information, including: transmitting, by a terminal device, a plurality of data packets to a base station; receiving, by the terminal device, feedback information transmitted by the base station when the base station determines that there is an unsuccessfully received data packet in the plurality of data packets where the feedback information is configured for feeding back the receiving status of the plurality of data packets, and the feedback information includes only negative acknowledgement (NACK) information for negatively acknowledging the unsuccessfully received data packet; and determining, by the terminal device, the unsuccessfully received data packet according to the NACK information; retransmitting, by the terminal device, the unsuccessfully received data packet to the base station.

Therefore, according to the method for transmitting feedback information in an embodiment of the present application, the base station transmits feedback information to the terminal device when determining that there is an unsuccessfully received data packet in the plurality of data packets transmitted by the terminal device, where the feedback information is configured for feeding back the receiving status of the plurality of data packets, and the feedback information includes only NACK information for negatively acknowledging the unsuccessfully received data packet. Therefore, the base station does not need to transmit specialized acknowledgement information to the base station for a successfully received data packet, thereby avoiding a waste of resources and improving the throughput of the communication system.

In conjunction with the third aspect, in a first possible implementation of the third aspect, the NACK information carries the identification information, where the identification information is index information of a radio frame and a subframe that are occupied by the base station when receiving the unsuccessfully received data packet, or the identification information is a serial number of the unsuccessfully received data packet. Where the determining, by the terminal device, the unsuccessfully received data packet according to the NACK information includes: determining, by the terminal device, the unsuccessfully received data packet according to the identification information.

In conjunction with the third aspect or the first possible implementation of the third aspect, in a second possible implementation of the third aspect, the receiving, by the terminal device, feedback information transmitted by the base station when the base station determines that there is an unsuccessfully received data packet in the plurality of data packets includes: receiving, by the terminal device, the downlink control channel transmitted by the base station, where the downlink control channel only carries the feedback information; alternatively, receiving, by the terminal device, the downlink control channel transmitted by the base station, where the downlink control channel carries the feedback information and the downlink control signaling.

A fourth aspect provides a method for transmitting feedback information, including: transmitting, by a base station, a plurality of data packets to a terminal device; receiving, by the base station, first feedback information transmitted by the terminal device when the terminal device determines that there is an unsuccessfully received data packet in the plurality of data packets, where the first feedback information is configured for feeding back the receiving status of the plurality of data packets, and the first feedback information includes only negative acknowledgement (NACK) information for negatively acknowledging the unsuccessfully received data packet; determining, by the base station, the unsuccessfully received data packet according to the NACK information; retransmitting, by the base station, the unsuccessfully received data packet to the base station.

Therefore, according to the method for transmitting feedback information in the embodiments of the present application, after the base station transmits a plurality of data packets to the terminal device, the base station receives the first feedback information transmitted by the terminal device, where the first feedback information includes only NACK information for negatively acknowledging an unsuccessfully received data packet in the plurality of data packets. Therefore, the base station does not receive specialized acknowledgement information transmitted by the terminal device for a successfully received data packet, thereby avoiding a waste of resources and improving the throughput of the communication system.

In conjunction with the fourth aspect, in a first possible implementation of the fourth aspect, the NACK information carries the identification information, where the identification information is index information of a radio frame and a subframe that are occupied by the terminal device when receiving the unsuccessfully received data packet, or the identification information is a serial number of the unsuccessfully received data packet, where the determining, by the base station, the unsuccessfully received data packet according to the NACK information includes: determining, by the base station, the unsuccessfully received data packet according to the identification information.

In conjunction with the fourth aspect or the first possible implementation of the fourth aspect, in a second possible implementation of the fourth aspect, before the base station transmits the plurality of data packets to the terminal device, the method further includes: transmitting, by the base station, the first information to the terminal device, where the first information is configured for indicating the first time-frequency resource allocated by the base station to the terminal device for transmitting feedback information; where the receiving, by the base station, first feedback information which is transmitted by the terminal device when the terminal device determines that there is an unsuccessfully received data packet in the plurality of data packets includes: receiving, by the base station, the first feedback information on the first time-frequency resource.

In conjunction with the second possible implementation of the fourth aspect, in a third possible implementation of the fourth aspect, the method further includes: transmitting, by the base station, second information to the terminal device, where the second information is configured for indicating the terminal device to feed back receiving status of the plurality of data packets to the base station using a first manner or a second manner when each data packet in the plurality of data packets is successfully received; where the first manner is to transmit second feedback information to the base station on the first time-frequency resource, where the second feedback information includes acknowledgement (ACK) information, and the ACK information is configured for indicating that each data packet in the plurality of data packets is successfully received by the terminal device; the second manner is to not transmit feedback information to the base station on the first time-frequency resource.

In conjunction with the second or third possible implementation of the fourth aspect, in a fourth possible implementation of the fourth aspect, the first time-frequency resource is a plurality of time-frequency resources, and a time interval between two adjacent time-frequency resources is a first preset value.

In conjunction with the fourth aspect or the first possible implementation of the fourth aspect, in a fifth possible implementation of the fourth aspect, the method further includes: receiving, by the base station, third information transmitted by the terminal device, where the third information is configured for requesting the base station to allocate, to the terminal device, time-frequency resource for transmitting the first feedback information; where the receiving, by the base station, first feedback information which is transmitted by the terminal device when the terminal device determines that there is an unsuccessfully received data packet in the plurality of data packets includes: if the base station transmits the fourth information to the terminal device in a preset time period from the time when the third information is received by the base station, the first feedback information on the second time-frequency resource indicated by the fourth information.

In conjunction with the fifth possible implementation of the fourth aspect, in a sixth possible implementation of the fourth aspect, the method further includes: if the base station does not transmit the fourth information to the terminal device in a preset time period from the time when the third information is received by the base station, receiving, by the base station, the first feedback information on the third time-frequency resource. where the third time-frequency resource is a time-frequency resource allocated by the base station, for transmitting feedback information, to the terminal device before the base station transmits the plurality of data packets to the terminal device, where the third time-frequency resource is a plurality of time-frequency resources, and the time interval between two adjacent time-frequency resources of the plurality of time-frequency resources is a second preset value.

In conjunction with the fifth or the sixth possible implementation of the fourth aspect, in a seventh possible implementation of the fourth aspect, the thirdly information is uplink scheduling request (SR) information, and the fourth information is an uplink grant (UL Grant) signaling; alternatively the thirdly information is uplink scheduling request (SR) information, and the fourth information is a radio resource control (RRC) signaling.

In conjunction with the fourth aspect, or any possible implementation of the first to the seventh possible implementations of the fourth aspect, in an eighth possible implementation of the fourth aspect, before the base station transmits the plurality of data packets to the terminal device, the method further includes: transmitting, by the base station, fifth information to the terminal device, where the fifth information is configured for indicating a feedback manner in which the terminal device feeds back the receiving status of the plurality of data packets; where the first feedback information is transmitted to the base station when the fifth information indicates the terminal device to adopt a target feedback manner, where the target feedback manner is that the terminal device transmits, to the base station, the feedback information including only the NACK information for negatively acknowledging the unsuccessfully received data packet in case that the terminal device determines that there is unsuccessfully received data packet.

In conjunction with the eighth possible implementation of the fourth aspect, in a ninth possible implementation of the fourth aspect, the transmitting, by the base station, fifth information to the terminal device includes: transmitting, by the base station, an uplink grant (UL Grant) signaling to the terminal device, where the UL grant signaling carries the fifth information; or, transmitting, by the base station a downlink grant (DL Grant) signaling to the terminal device, where the DL grant signaling carries the fifth information; or, transmitting, by the base station, a radio resource control (RRC) signaling to the terminal device, where the RRC signaling carries the fifth information.

A fifth aspect provides a method for transmitting feedback information, including: transmitting, by a base station, a data packet to a terminal device; receiving, by the base station, first information transmitted by the terminal device when the terminal device determines that the data packet is unsuccessfully received, where the first information is configured for requesting the base station to allocate, to the terminal device, a time-frequency resource for transmitting negative acknowledgement (NACK) information, and the NACK information is configured for negatively acknowledging the data packet.

Therefore, according to the method for transmitting feedback information in an embodiment of the present application, the first information transmitted by the terminal device, which is then received by the base station and configured to request the allocation of the time-frequency resource for transmitting the NACK information, is transmitted in a case where the terminal device determines that the terminal device does not successfully receive the data packet transmitted by the base station. Therefore, the base station does not need to allocate time-frequency resources, for transmitting NACK information, to the terminal device in advance, thereby avoiding waste of resources and improving throughput of the communication system.

In conjunction with the fifth aspect, in a first possible implementation of the fifth aspect, the method further includes: if the base station transmits the second information to the terminal device in a preset time period from a time when the first information is received by the base station, receiving, by the base station, the NACK information on the first time-frequency resource indicated by the second information.

In conjunction with the first possible implementation of the fifth aspect, in a second possible implementation of the fifth aspect, the method further includes: if the base station does not transmit the second information to the terminal device in a preset time period from a time when the first information is received by the base station, receiving, by the base station, the NACK information on the second time-frequency resource. where the second time-frequency resource is a time-frequency resource allocated by the base station, for transmitting feedback information, to the terminal device before the base station transmits the data packet to the terminal device, where the second time-frequency resource is a plurality of time-frequency resources, and the time interval between two adjacent time-frequency resources of the plurality of time-frequency resources is a preset value.

In conjunction with the fifth aspect, or any possible implementation of the first or the second possible implementation of the fifth aspect, in a third possible implementation of the fifth aspect, the first information is uplink scheduling request (SR) information, and the second information is an uplink grant (UL Grant) signaling; alternatively the first information is uplink scheduling request (SR) information, and the second information is a radio resource control (RRC) signaling.

A sixth aspect provides a method for transmitting feedback information, including: receiving, by the base station, a plurality of data packets transmitted by the terminal device; if the base station determines that there is an unsuccessfully received data packet in the plurality of data packets, transmitting, by the base station, feedback information to the terminal device, where the feedback information is configured for feeding back receiving status of the plurality of data packets, and the feedback information includes only negative acknowledgement (NACK) information for negatively acknowledging the unsuccessfully received data packet.

Therefore, according to the method for transmitting feedback information in an embodiment of the present application, the base station transmits feedback information to the terminal device when determining that there is an unsuccessfully received data packet in the plurality of data packets transmitted by the terminal device, where the feedback information is configured for feeding back receiving status of the plurality of data packets, and the and feedback information includes only NACK information for negatively acknowledging the unsuccessfully received data packet. Therefore, the base station does not need to transmit specialized acknowledgement information to the base station for a successfully received data packet, thereby avoiding a waste of resources and improving the throughput of the communication system.

In conjunction with the sixth aspect, in a first possible implementation of the sixth aspect, the NACK information carries the identification information, where the identification information is used by the terminal device to determine, according to the identification information, the unsuccessfully received data packet; where the identification information is index information of a radio frame and a subframe that are occupied by the base station when receiving the unsuccessfully received data packet, or the identification information is a serial number of the unsuccessfully received data packet.

In conjunction with the sixth aspect or the first possible implementation of the sixth aspect, in a second possible implementation of the sixth aspect, the transmitting, by the base station, feedback information to the terminal device includes: transmitting, by the base station, the downlink control channel to the terminal device, where the downlink control channel only carries the feedback information; alternatively, transmitting, by the base station, the downlink control channel to the terminal device, where the downlink control channel carries the feedback information and the downlink control signaling.

A seventh aspect provides a terminal device for performing the method of the first aspect or any possible implementation of the first aspect described above. In particular, the terminal device includes functional modules for performing the method of the first aspect or any possible implementation of the first aspect described above.

An eighth aspect provides a terminal device for performing the method of the second aspect or any possible implementation of the second aspect described above. In particular, the terminal device includes functional modules for performing the method of the second aspect or any possible implementation of the second aspect described above.

A ninth aspect provides a terminal device for performing the method of the third aspect or any possible implementation of the third aspect described above. In particular, the terminal device includes a functional module for performing the method of the third aspect or any possible implementation of the third aspect described above.

A tenth aspect provides a base station for performing the method of the fourth aspect or any possible implementation of the fourth aspect described above. In particular, the base station includes a functional module for performing the method of the fourth aspect or any possible implementation of the fourth aspect described above.

An eleventh aspect provides a base station for performing the method of the fifth aspect or any possible implementation of the fifth aspect described above. In particular, the base station includes a functional module for performing the method of the fifth aspect or any possible implementation of the fifth aspect described above.

A twelfth aspect provides a base station for performing the method of the sixth aspect or any possible implementation of the sixth aspect described above. In particular, the base station includes a functional module for performing the method of the sixth aspect or any possible implementation of the sixth aspect described above.

A thirteenth aspect provides a terminal device including: a processor, a memory, a receiver, and a transmitter, where the processor, the memory, the receiver, and the transmitter are connected by a bus system, the memory is configured to store instructions, the processor is configured to execute instructions stored in the memory to control the receiver to receive information and to control the transmitter to transmit information, such that the terminal device performs the method of the first aspect or any possible implementation of the first aspect.

A fourteenth aspect provides a terminal device including: a processor, a memory, a receiver, and a transmitter, the processor, where the memory, the receiver, and the transmitter are connected by a bus system, the memory is configured to store instructions, the processor is configured to execute instructions stored in the memory to control the receiver to receive information and to control the transmitter to transmit information, such that the terminal device performs the method of the second aspect or any possible implementation of the second aspect.

A fifteenth aspect provides a terminal device including: a processor, a memory, a receiver, and a transmitter, where the processor, the memory, the receiver, and the transmitter are connected by a bus system, the memory is configured to store instructions, the processor is configured to execute instructions stored in the memory to control the receiver to receive information and to control the transmitter to transmit information, such that the terminal device performs the method of the third aspect or any possible implementation of the third aspect.

A sixteenth aspect provides a base station including: a processor, a memory, a receiver, and a transmitter, where the processor, the memory, the receiver, and the transmitter are connected by a bus system, the memory is configured to store instructions, the processor is configured to execute instructions stored in the memory to control the receiver to receive information and to control the transmitter to transmit information, such that the base station performs the method of the fourth aspect or any possible implementation of the fourth aspect.

A seventeenth aspect provides a base station including: a processor, a memory, a receiver, and a transmitter, where the processor, the memory, the receiver, and the transmitter are connected by a bus system, the memory is configured to store instructions, the processor is configured to execute instructions stored in the memory to control the receiver to receive information and to control the transmitter to transmit information, such that the base station performs the method of the fifth aspect or any possible implementation of the fifth aspect.

An eighteenth aspect provides a base station including: a processor, a memory, a receiver, and a transmitter, where the processor, the memory, the receiver, and the transmitter are connected by a bus system, the memory is configured to store instructions, the processor is configured to execute instructions stored in the memory to control the receiver to receive information and to control the transmitter to transmit information, such that the base station performs the method of the sixth aspect or any possible implementation of the sixth aspect.

A nineteenth aspect provides a computer readable medium for storing a computer program, the computer program including instructions for performing the method of the first aspect or any possible implementation of the first aspect.

A twentieth aspect provides a computer readable medium for storing a computer program, the computer program including instructions for performing the method of the second aspect or any possible implementation of the second aspect.

A twenty-first aspect provides a computer readable medium for storing a computer program, the computer program including instructions for performing the method of the third aspect.

A twenty-second aspect provides a computer readable medium for storing a computer program, the computer program including instructions for performing the method of the fourth aspect.

A twenty-third aspect provides a computer readable medium for storing a computer program, the computer program including instructions for performing the method of the fifth aspect.

A twenty-fourth aspect provides a computer readable medium for storing a computer program, the computer program including instructions for performing the method of the sixth aspect.

BRIEF DESCRIPTION OF DRAWINGS

In order to more clearly illustrate the technical solutions of the embodiments of the present disclosure, the drawings to be used in the embodiments of the present disclosure will be briefly described below. It is obvious that the drawings described below are only some embodiments of the present disclosure. Those skilled in the art can also obtain other drawings based on these drawings without resorting to any creative work.

DESCRIPTION OF EMBODIMENTS

The technical solutions in the embodiments of the present disclosure are clearly and completely described in the following with reference to the accompanying drawings in the embodiments of the present disclosure. It is obvious that the described embodiments are a part rather than all of the embodiments of the present disclosure. All other embodiments obtained by a person of ordinary skill in the art based on the embodiments of the present disclosure without creative efforts shall fall within the protection scope of the present disclosure.

It should be understood that the technical solutions of the embodiments of the present disclosure can be applied to various communication systems, for example, Global System of Mobile communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD), Universal Mobile Telecommunication System (UMTS) or Worldwide Interoperability for Microwave Access (WiMAX) communication system, 5G system, or New Radio (NR) system.

In the embodiments of the present disclosure, the nouns "network" and "system" are often used interchangeably, but those skilled in the art can understand the meanings thereof. The terminal device involved in the embodiments of the present disclosure may include various handheld devices, in-vehicle devices, wearable devices, computing devices, or other processing devices having wireless communication functions and connected to a wireless modem, and various forms of user devices (UE), mobile station (MS), terminal, terminal device, and the like. For convenience of description, in the embodiments of the present disclosure, the devices mentioned above are collectively referred to terminal devices.

The base station (BS) involved in the embodiments of the present disclosure is a device deployed in a radio access network to provide a wireless communication function for a terminal device. The base station may include various forms of macro base stations, micro base stations, relay stations, access points, and the like. In systems with different wireless access technologies, the names of devices with a base station function may vary. For example, it is called an Evolved NodeB (eNB or eNodeB) in an LTE network, and called a Node B in a 3rd Generation (3G) network. For convenience of description, in the embodiments of the present disclosure, the foregoing apparatus for providing a wireless communication function for a terminal device is collectively referred to as a base station or BS.

Figure 1:
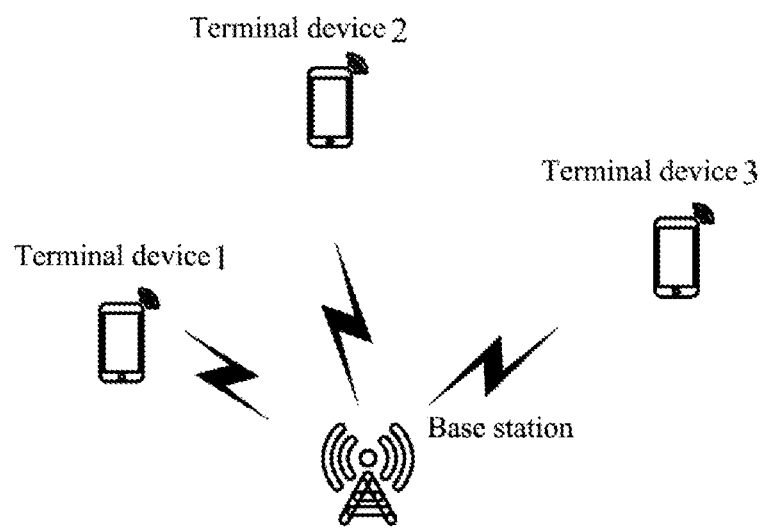
FIG. 1 is a schematic diagram of an application scenario of an embodiment of the present disclosure.

FIG. 1 is a schematic diagram of an application scenario of an embodiment of the present disclosure. As shown in FIG. 1, the base station communicates with a plurality of terminal devices (terminal device 1 to terminal device 3) via wireless signals. The wireless signals generally used for communication are transmitted and received in a certain modulation manner, and can be classified into two categories: single carrier modulation and multi-carrier modulation.

It should be noted that only the case of one base station (an isolated base station) is illustrated in the application scenario shown in FIG. 1. However, the present disclosure is not limited thereto. The base station may also have a neighboring base station and a terminal device that transmit traffic on a same or a different time-frequency resource, and the coverage of each base station may further include other numbers of terminal devices.

In an embodiment, in FIG. 1, the wireless communication system in which the base station and the terminal device are located may further include other network entities, such as a network controller, a mobility management entity, and the like, and the embodiments of the present disclosure is not limited thereto.

It should be noted that, in the process of describing the embodiments of the present disclosure, the downlink transmission process refers to a related procedure in which a base station transmits a data packet to a terminal device, and the uplink transmission process refers to a related procedure in which the terminal device transmits a data packet to the base station.

Figure 2:
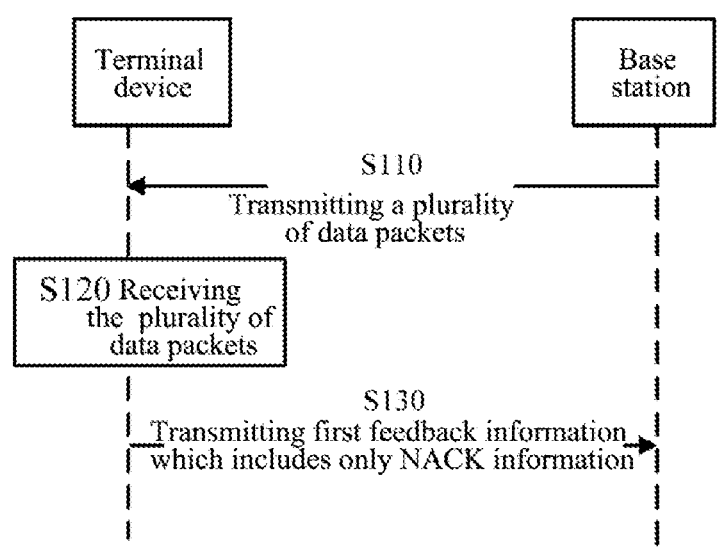
FIG. 2 and FIG. 2A are schematic flowcharts of a method for transmitting feedback information according to embodiments of the present disclosure.
Figure 2A:
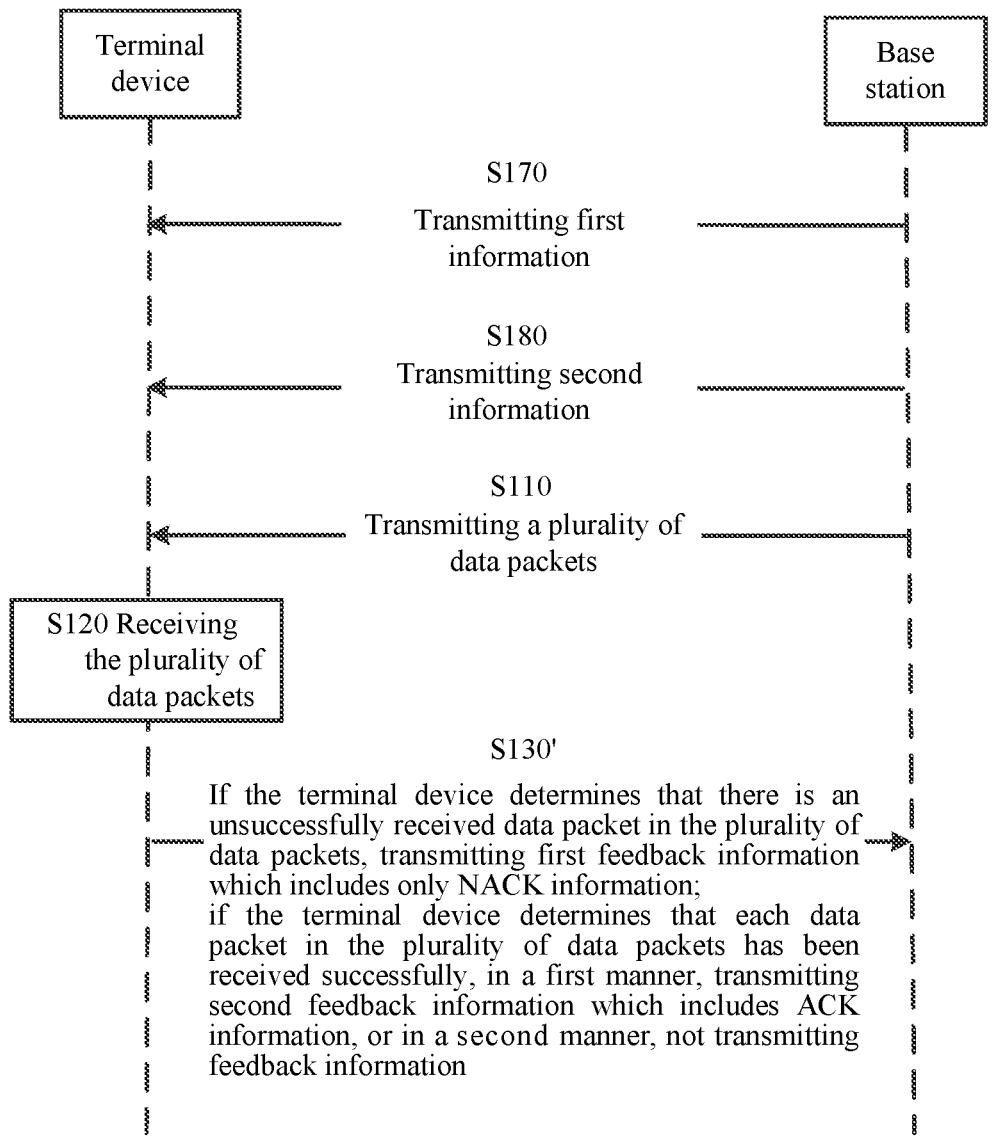

FIG. 2 and FIG. 2A are schematic flowcharts of a method for transmitting feedback information according to embodiments of the present disclosure. As shown in FIG. 2, the method 100 includes:

S110, transmitting, by a base station, a plurality of data packets to a terminal device.

Figure 3:
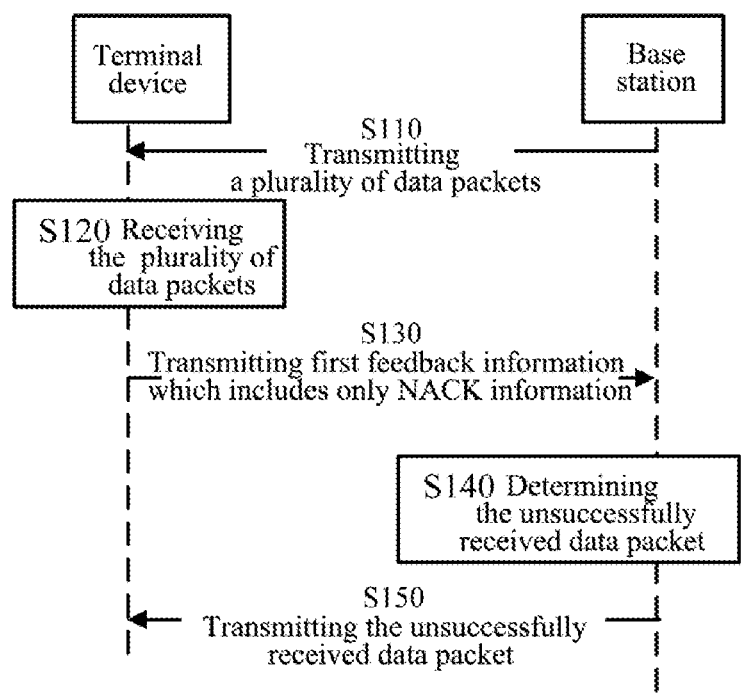
FIG. 3 is another schematic flowchart of a method for transmitting feedback information according to an embodiment of the present disclosure.

S120, receiving, by the terminal device, the plurality of data packets transmitted by the base station;

S130, if the terminal device determines that there is an unsuccessfully received data packet in the plurality of data packets, transmitting, by the terminal device, first feedback information to the base station, where the first feedback information is configured for feeding back receiving status of the plurality of data packets, and the first feedback information includes only negative acknowledgement (NACK) information for acknowledging the unsuccessfully received data packet;

In an embodiment, as shown in FIG. 3, the method 100 further includes:

S140, determining, by the base station, the unsuccessfully received data packet according to the NACK information;

S150, retransmitting, by the base station, the unsuccessfully received data packet to the terminal device;

It should be noted that the data packet is unsuccessfully received may also be expressed as an error occurs in the transmission (or reception) of the data packet. The number of the unsuccessfully received data packets may be one or more, which is not defined in the present disclosure.

According to the method of an embodiment of the present disclosure, when the terminal device determines that there is an unsuccessfully received data packet, the terminal device transmits the first feedback information to the base station may be understood as the terminal device transmits the first feedback information to the base station only when an error occurs in the reception of the data packet. And the first feedback information includes only a negative acknowledgement (NACK) information for negatively acknowledging the incorrectly received data packet. When the first feedback information is received, the base station defaults to that all the data packets of the plurality of data packets except the data packet corresponding to the NACK information, are successfully received.

In an embodiment of the present disclosure, after receiving the plurality of data packets, the terminal device may demodulate and/or decode each data packet, and determine the unsuccessfully received data packet in the plurality of data packets; after receiving one data packet, the terminal device may also demodulate and/or decode the data packet, determine whether the data packet is successfully received, until the terminal device completes receiving the plurality of data packets, and when determining that there is an unsuccessfully received data packet in the plurality of data packets, the terminal device transmits a feedback about the receiving status of the plurality of data packets to the base station.

In an embodiment, the information in S130 carries the identification information, and the base station determines, according to the identification information, the unsuccessfully received data packet. The identification information is index information of a radio frame and a subframe occupied by the terminal device when receiving the unsuccessfully received data packet, the index information of the radio frame and the subframe may be, for example, the serial number of the radio frame and the serial number of the subframe; alternatively the identification information is the serial number of the unsuccessfully received data packet.

In an embodiment, as shown in FIG. 2A, in a downlink transmission process, before the base station transmits the plurality of data packets to the terminal device, the base station configures, for the terminal device, an uplink transmission resource on the given time-frequency resource position, and transmits the first information to the terminal device to indicate the uplink transmission resource on the given time-frequency position (see S170 in FIG. 2A). The terminal device transmits the first feedback information by using the uplink transmission resource on the given position. And, in this implementation, the base station may transmit second information to the terminal device (see S180 in FIG. 2A), where the second information is configured for indicating the terminal device to feed back receiving status of the plurality of data packets to the base station using a first manner or a second manner when each data packet in the plurality of data packets is successfully received; where the first manner is to transmit the second feedback information on the uplink transmission resource on the given time-frequency position, where the second feedback information includes ACK information, where the ACK information is configured for indicating that each data packet in the plurality of data packets is successfully received by the terminal device. The second manner is to not transmit feedback information to the base station on the uplink transmission resource on the given time-frequency resource position (see S130' in FIG. 2A).

That is, if the base station configures the terminal device with an uplink transmission resource on the given time-frequency position for transmitting the feedback information, the terminal device may, after successfully receiving each of the plurality of data packets, transmit ACK information to the base station on the uplink transmission resource on the given time-frequency position. The terminal device may also choose not to transmit feedback information to the base station on the uplink transmission resource on the given time-frequency position. If the terminal device chooses not to transmit feedback information to the base station on the uplink transmission resource on the given time-frequency position, the base station cannot detect any information transmitted by the terminal device on the uplink transmission resource on the given time-frequency position, and the base station defaults to that the terminal device successfully receives all packets transmitted by the base station.

As an example, the uplink transmission resource on the given time-frequency position configured by the base station for the terminal device is a periodic uplink transmission resource, or can be understood as a time interval between two adjacent uplink transmission resources is a first preset value. And then when the first information indicates the uplink transmission resource on the given time-frequency position, the first information may indicate the specific position of the uplink transmission resource, e.g., the serial number of the subframe corresponding to the uplink transmission resource, and the first information may further indicate the position of the first uplink transmission resource in the uplink transmission resource (e.g., the serial number of the corresponding subframe) and the first preset value. The terminal device may calculate the time-frequency position of all the uplink transmission resources according to the position of the first uplink transmission resource and the first preset value.

Figure 4:
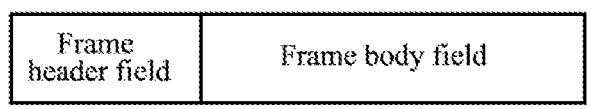
FIG. 4 is a schematic structural diagram of an NACK frame according to an embodiment of the present disclosure.

For example, the base station may configure the uplink transmission resource in every 100 subframes located on the given time-frequency position for the terminal device (it can be understood that the first preset value in the above is 100 subframes). The terminal device receives, on 100 subframes, the data packet transmitted by the base station, and then feeds back in which subframe of the 100 subframes an error occurs to the base station, on the uplink transmission resource on the given time-frequency position after the 100 subframes. FIG. 4 shows a frame format of a NACK frame carrying NACK information, the NACK frame including a frame header field and a frame body field. For example, a NACK frame may include 10 bits, where a frame header field occupies 3 bits for carrying frame header information of a NACK frame, and the frame header information may include, for example, a frame indicating that the NACK frame is configured to negatively acknowledging the receiving status of the data packets, where the frame body field occupies 7 bits, which indicates on which frame(s) of the 100 subframes an error of the data packet transmission occurs.

In an embodiment of the present disclosure, if the terminal device determines that there is a data packet unsuccessfully received in the plurality of data packets, the terminal device transmits the third information to the base station, where the third information is configured for request the base station to allocate a time-frequency resource, for transmitting the first feedback information, to the terminal device, and if the terminal device receives the fourth information transmitted by the base station in the preset time period from the time when the third information is transmitted to the base station, the terminal device transmits the first feedback information to the base station on the second time-frequency resource indicated by the fourth information.

In other words, when the terminal device determines that there is an unsuccessfully received data packet, the terminal device applies to the base station for the uplink transmission resource for transmitting the NACK information. If the terminal device receives the uplink transmission resource allocated by the base station in the preset time, the terminal device transmits NACK information to the base station on the uplink transmission resource, indicating in the transmission of which data packet(s) an error occurs.

In an embodiment of the present disclosure, if the terminal device determines that there is an unsuccessfully received data packet in the plurality of data packets, the terminal device transmits the third information to the base station, where the third information is configured for request the base station to allocate a time-frequency resource, for transmitting the first feedback information, to the terminal device, and if the terminal device does not receives the fourth information transmitted by the base station in the preset time period from the time when the third information is transmitted to the base station, the terminal device transmits the first feedback information to the base station on the third time-frequency resource, where the third time-frequency resource is a time-frequency resource allocated by the base station, for transmitting feedback information, to the terminal device before the terminal device receives the plurality of data packets transmitted by the base station, where the third time-frequency resource is a plurality of time-frequency resources, and the time interval between two adjacent time-frequency resources of the plurality of time-frequency resources is a second preset value.

In other words, the base station simultaneously configures, for the terminal device, a periodic uplink transmission resource on a given time-frequency position and a transmission resource for transmitting the third information for applying for transmitting the NACK information. When the terminal device finds that there is an unsuccessfully received data packet, the terminal device first applies for the uplink transmission resource by transmitting the third information to the base station. If the fourth information indicating the uplink transmission resource transmitted by the base station is not received in the preset time period, the terminal device considers that the resource application fails, and the terminal device transmits the NACK information to the base station with the periodic uplink transmission resource on given time-frequency position configured by the base station, thereby ensuring the performance of the communication system.

In the above example, the terminal device may transmit an application request to the base station by using an existing uplink scheduling request (SR). Correspondingly, the base station configures the terminal device with an uplink transmission resource for transmitting NACK information by using the existing uplink grant (UL Grant) signaling or Radio Resource Control (RRC) signaling. The RRC signaling may be, for example, an RRC Connection Setup message. In this example, the base station may separately allocate, for the terminal device, the uplink transmission resource for transmitting the SR for applying for transmitting the NACK information, so as to be distinguished from the SR for applying for allocating the uplink transmission resource for the data transmission in the related art.

Figure 5:
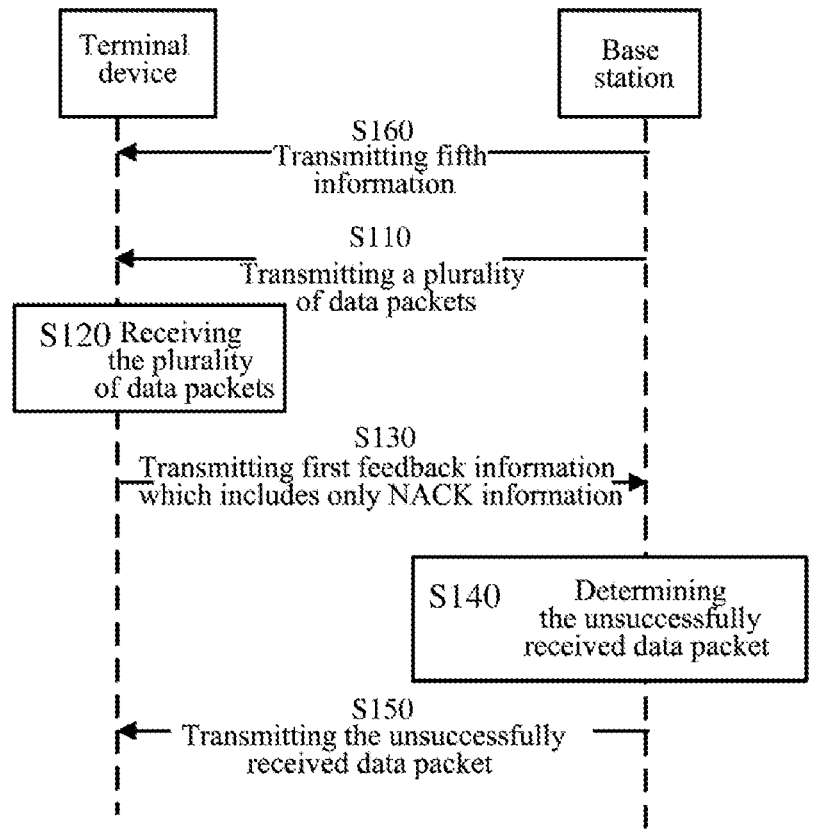
FIG. 5 is yet another schematic flowchart of a method for transmitting feedback information according to an embodiment of the present disclosure.

In an embodiment of the present disclosure, as shown in FIG. 5, before S110, the method 100 further includes:

S160, receiving, by the terminal device, fifth information transmitted by the base station, where the fifth information is configured for indicating a feedback manner in which the terminal device feeds back receiving status of the plurality of data packets.

Correspondingly, S130 specifically is: when the fifth information indicates the terminal device to adopt a target feedback manner, transmitting, by the terminal device, the first feedback information to the base station, where the target feedback manner is that the terminal device transmits, to the base station, the feedback information including only the NACK information for negatively acknowledging the unsuccessfully received data packet in case that the terminal device determines that there is unsuccessfully received data packet.

In an embodiment, before the base station transmits the fifth information to the terminal device, the base station determines a feedback manner which the terminal device needs to adopt. Specifically, the base station determines, according to the channel state or the service transmission characteristic, a feedback manner which the terminal device needs to adopt, for example, when the base station determines that the channel condition is good (a transmission error may occur when many data packets are transmitted) and transmission is of a large data volume, the base station indicates the terminal device to feed back the receiving status of the plurality of data packets in a target feedback manner. When the base station determines that the channel condition is not good (for example, the error probability of the data packet transmission is greater than a preset threshold) or the base station determines that the transmission is only of small data volume transmission (for example, only one data packet is transmitted), the base station indicates the terminal device to feed back the receiving status of each data packet in the feedback manner of the existing LTE.

In an embodiment, in S160, the base station transmits an uplink grant (UL Grant) signaling to the terminal device, where the UL Grant signaling carries the fifth information; or, the base station transmits a downlink grant (DL Grant) to the terminal device, where the DL Grant signaling carries the fifth information; or, the base station transmits an RRC signaling to the terminal device, where the RRC signaling carries the fifth information, where the RRC signaling may be an RRC Connection Setup message.

Figure 6:
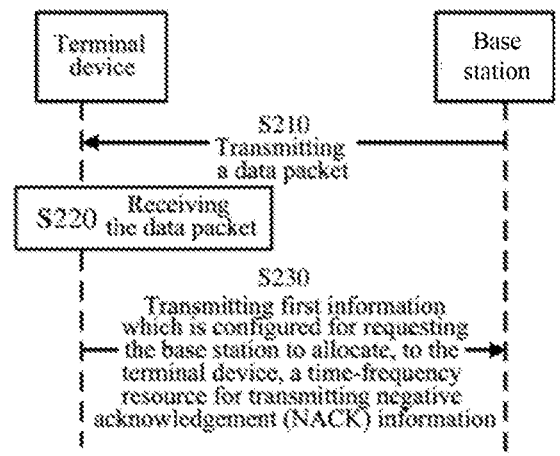
FIG. 6 is a schematic flowchart of a method for transmitting feedback information according to another embodiment of the present disclosure.

FIG. 6 illustrates a method of transmitting feedback information according to another embodiment of the present disclosure, as shown in FIG. 6, the method 200 includes:

S210, transmitting, by a base station, a data packet to a terminal device;

S220, receiving, by the terminal device, the data packet transmitted by the base station;

S230, if the terminal device determines that the data packet is not successfully received, transmitting, by the terminal device, first information to the base station, where the first information is configured for request the base station to allocate, to the terminal device, a time-frequency resource for transmitting negative acknowledgement (NACK) information, and the NACK information is configured for negatively acknowledging the data packet.

It can be understood that, according to the method for transmitting feedback information of embodiment of the present disclosure, the terminal device applies to the base station for time-frequency resources for transmitting NACK information only when determining that the data packet transmitted by the base station is not successfully received. If the terminal device successfully receives the data packet, the terminal device does not need to transmit any feedback information to the base station.

In an embodiment, if the terminal device receives second information transmitted by the base station in a preset time period from a time when the first information is transmitted to the base station, transmitting, by the terminal device, the NACK information to the base station on the first time-frequency resource indicated by the second information. In other words, if the terminal device receives the uplink transmission resource allocated by the base station in the preset time, the terminal device transmits NACK information to the base station on the uplink transmission resource, indicating that an error occurs in the transmission of the data packet.

In an embodiment, if the terminal device does not receive the second information in the preset time period from the time when the first information is transmitted to the base station, transmitting, by the terminal device, the NACK information to the base station on a second time-frequency resource; where the second time-frequency resource is a time-frequency resource allocated by the base station, for transmitting feedback information, to the terminal device before the terminal device receives the data packet, where the second time-frequency resource is a plurality of time-frequency resources, and the time interval between two adjacent time-frequency resources in the plurality of time-frequency resources is a preset value.

That is to say, the base station simultaneously configures, for the terminal device, a periodic uplink transmission resource on a given time-frequency position and a transmission resource for transmitting the first information for applying for transmitting the NACK information. When the terminal device finds that there is an unsuccessfully received data packet, the terminal device first applies for the uplink transmission resource by transmitting the first information to the base station. If the second information indicating the uplink transmission resource transmitted by the base station is not received in the preset time period, the terminal device considers that the resource application fails, and the terminal device transmits the NACK information to the base station using the periodic uplink transmission resource on given time-frequency position configured by the base station.

It should be noted that, in the method 200, the specific implementations in which the terminal device requests the base station to apply for the uplink transmission resource for transmitting the NACK information, and in which the base station configures the terminal device with the uplink transmission resource for transmitting the NACK information are the same as that in the method 100, which will not be repeated herein so as to avoid repetition.

And, like the method 100, the base station may also transmit the indication information to the terminal device before the terminal device receives the data packet, where the indication information is configured for indicating a feedback manner in which the terminal device feeds back the receiving status of the data packet; the terminal device feeds back the receiving status of the data packet according to the method in the method 200 when the indication information indicates a feedback manner in which the terminal device feeds back by transmitting NACK information to the base station only when the data packet is unsuccessfully received. Where the implementation in which the base station transmits the indication information to the terminal device is the same as the implementation in which the base station transmits the fifth information to terminal device as recited in the method 100, which will not be repeated herein so as to avoid repetition.

Figure 7:
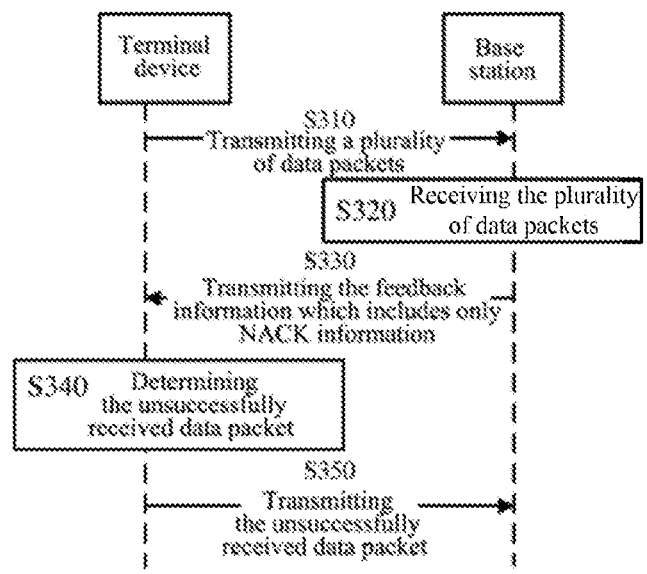
FIG. 7 is a schematic flowchart of a method for transmitting feedback information according to yet another embodiment of the present disclosure.

FIG. 7 is the method for transmitting feedback information according to yet another embodiment of the present disclosure, as shown in FIG. 7, the method 300 includes:

S310, transmitting, by a terminal device, a plurality of data packets to a base station;

S320, receiving, by the base station, the plurality of data packets transmitted by the terminal device;

S330, receiving, by the terminal device, feedback information transmitted by the base station when the base station determines that there is an unsuccessfully received data packet in the plurality of data packets, where the feedback information is configured for feeding back the receiving status of the plurality of data packets, and the feedback information includes only negative acknowledgement (NACK) information for negatively acknowledging the unsuccessfully received data packet;

S340, determining, by the terminal device, the unsuccessfully received data packet according to the NACK information;

S350, retransmitting, by the terminal device, the unsuccessfully received data packet to the base station.

According to a method of an embodiment of the present disclosure, when the base station determines that there is an unsuccessfully received data packet in the plurality of data packets, the base station transmits feedback information to the terminal device, which may be understood as that the base station transmits feedback information to the terminal device only when an error occurs in the reception of the data packet, and the feedback information only includes NACK information for negatively acknowledging the data packet which is incorrectly received. After receiving the feedback information, the terminal device defaults to that all the data packets of the plurality of data packets except the data packet corresponding to the NACK information, are successfully received.

Moreover, it can be understood that, if the terminal device transmits only one data packet to the base station while the base station successfully receives the data packet, the base station does not transmit feedback information to the terminal device. Then the terminal device does not receive any feedback information transmitted by the base station for a period of time, and the terminal device defaults to that the base station successfully receives the data packet. When the base station does not receive the data packet successfully, the base station transmits feedback information to the terminal device. The terminal device retransmits the data packet to the base station after receiving the feedback information.

In an embodiment, the NACK information carries the identification information, and the terminal device determines, according to the identification information, the unsuccessfully received data packet. The identification information is index information of a radio frame and a subframe occupied by the base station when receiving the unsuccessfully received data packet. The index information of the radio frame and the subframe may be, for example, the serial number of the radio frame and the serial number of the subframe; alternatively the identification information is the serial number of the unsuccessfully received data packet.

In an embodiment, in S330, the base station transmits the downlink control channel to the terminal device, where the downlink control channel only carries the feedback information; alternatively, the base station transmits the downlink control channel to the terminal device, where the downlink control channel carries the feedback information and the downlink control signaling.

In an embodiment, the downlink control channel is physical downlink control channel (PDCCH).

Figure 8:
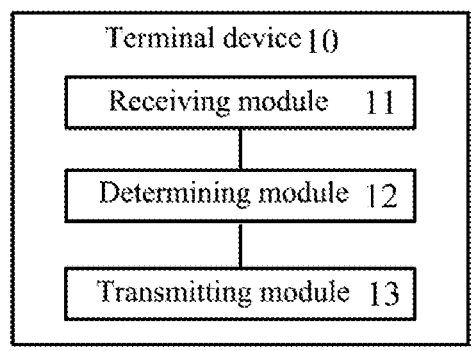
FIG. 8 is a schematic block diagram of a terminal device according to an embodiment of the present disclosure.

The method of transmitting feedback information according to an embodiment of the present disclosure is described in detail above with reference to FIG. 2 to FIG. 7, and a terminal device according to an embodiment of the present disclosure will be described in detail below with reference to FIG. 8. As shown in FIG. 8, the terminal device 10 includes:

a receiving module 11, configured to receive a plurality of data packets transmitted by a base station;

a determining module 12, configured to determine whether there is an unsuccessfully received data packet in the plurality of data packets;

a transmitting module 13, configured to: transmit first feedback information to the base station if the determining module 12 determines that there is an unsuccessfully received data packet in the plurality of data packets, where the first feedback information is configured for feeding back receiving status of the plurality of data packets, and the first feedback information includes only negative acknowledgement (NACK) information for negatively acknowledging the unsuccessfully received data packet.

Therefore, the terminal device according to the embodiment of the present disclosure transmits the first feedback information to the base station when determining that there is an unsuccessfully received data packet in the plurality of data packets transmitted by the base station, and the first feedback information includes only NACK information for negatively acknowledging the unsuccessfully received data packet. Therefore, the terminal device does not need to transmit specialized acknowledgement information to the base station for a successfully received data packet, thereby avoiding a waste of resources and improving the throughput of the communication system.

In an embodiment of the present disclosure, the NACK information carries the identification information, where the identification information is used by the base station to determine, according to the identification information, the unsuccessfully received data packet;

Where, the identification information is index information of a radio frame and a subframe that are occupied by the receiving module 11 when receiving the unsuccessfully received data packet, or the identification information is a serial number of the unsuccessfully received data packet.

In an embodiment of the present disclosure, before the receiving module 11 receives the plurality of data packets transmitted by the base station, the receiving module 11 is further configured to receive the first information transmitted by the base station, where the first information is configured for indicating the first time-frequency resource allocated by the base station to the terminal device for transmitting feedback information;

Where, in the aspect of transmitting the first feedback information to the base station, the transmitting module 13 is specifically configured to: transmit the first feedback information to the base station on the first time-frequency resource.

In an embodiment of the present disclosure, the receiving module 11 is further configured to: receive second information transmitted by the base station, where the second information is configured for indicating the terminal device to feed back receiving status of the plurality of data packets to the base station using a first manner or a second manner when each data packet in the plurality of data packets is successfully received;

Where the first manner is to transmit second feedback information to the base station on the first time-frequency resource, where the second feedback information includes acknowledgement (ACK) information, and the ACK information is configured for indicating that each data packet in the plurality of data packets is successfully received by the terminal device; the second manner is to not transmit feedback information to the base station on the first time-frequency resource.

In an embodiment of the present disclosure, the first time-frequency resource is a plurality of time-frequency resources, and a time interval between two adjacent time-frequency resources of the plurality of time-frequency resources is a first preset value.

In an embodiment of the present disclosure, the receiving module 11 is further configured to transmit third information to the base station, where the third information is configured for requesting the base station to allocate, to the terminal device, time-frequency resource for transmitting the first feedback information;

where in the aspect of transmitting the first feedback information to the base station, the transmitting module 13 is configured to: transmit the first feedback information to the base station on the second time-frequency resource indicated by the fourth information if the receiving module 11 receives fourth information transmitted by the base station in a preset time period from a time when the third information is transmitted to the base station by the transmitting module 13.

In an embodiment of the present disclosure, the transmitting module 13 is further configured to: transmit the first feedback information to the base station on the third time-frequency resource if the receiving module 11 does not receive the fourth information in the preset time period from a time when the third information is transmitted to the base station by the transmitting module 13;

Where the third time-frequency resource is a time-frequency resource allocated by the base station, for transmitting feedback information, to the terminal device before the receiving module receives the plurality of data packets transmitted by the base station, where the third time-frequency resource is a plurality of time-frequency resources, and the time interval between two adjacent time-frequency resources of the plurality of time-frequency resources is a second preset value.

In an embodiment of the present disclosure, the third information is uplink scheduling request (SR) information, and the fourth information is an uplink grant (UL Grant) signaling; alternatively the third information is uplink scheduling request (SR) information, and the fourth information is a radio resource control (RRC) signaling.

In an embodiment of the present disclosure, before the receiving module 11 receives the plurality of data packets transmitted by the base station, the receiving module 11 is further configured to receive fifth information transmitted by the base station, where the fifth information is configured for indicating a feedback manner in which the terminal device feeds back receiving status of the plurality of data packets;

Where in the aspect of transmitting the first feedback information to the base station, the transmitting module 13 is specifically configured to: transmit the first feedback information to the base station when the fifth information indicates the terminal device to adopt a target feedback manner, where the target feedback manner is that the terminal device transmits, to the base station, the feedback information including only the NACK information for negatively acknowledging the unsuccessfully received data packet in case that the terminal device determines that there is unsuccessfully received data packet.

In an embodiment of the present disclosure, in the aspect of receiving the fifth information transmitted by the base station, the receiving module 11 is specifically configured to: receive an uplink grant (UL Grant) signaling transmitted by the base station, where the UL grant signaling carries the fifth information; or, receive a downlink grant (DL Grant) signaling transmitted by the base station, where the DL grant signaling carries the fifth information; or, receive a radio resource control (RRC) signaling transmitted by the base station, where the RRC signaling carries the fifth information.

As for the terminal device according to the embodiment of the present disclosure, reference may be made to the process of the method 100 for transmitting feedback information according to the embodiment of the present disclosure, and each unit/module in the terminal device and the other operations and/or functions described above are respectively for the implementation of the method 100, which will not be repeated herein for the sake of brevity.

Figure 9:
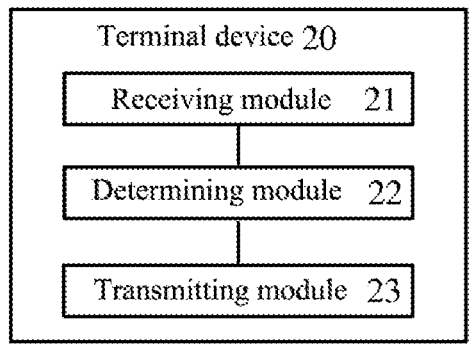
FIG. 9 is a schematic block diagram of a terminal device according to another embodiment of the present disclosure.

FIG. 9 is a schematic block diagram of a terminal device according to another embodiment of the present disclosure. As shown in FIG. 9, the terminal device 20 includes:

a receiving module 21, configured to receive a data packet transmitted by the base station;

a determining module 22, configured to determine whether the receiving module 21 successfully receives the data packet;

a transmitting module 23, configured to transmit the first information to the base station, if the determining module 22 determines that the data packet is unsuccessfully received by the receiving module 21, where the first information is configured for requesting the base station to allocate, to the terminal device, a time-frequency resource for transmitting negative acknowledgement (NACK) information, and the NACK information is configured for negatively acknowledging the data packet.

Therefore, when determining that the data packet transmitted by the base station is unsuccessfully received, the terminal device according to the embodiment of the present disclosure applies to the base station for a time-frequency resource for transmitting NACK information for negatively acknowledging the data packet. Therefore, the base station may not need to allocate the time-frequency resource, for transmitting the NACK information, to the terminal device in advance, and the terminal device does not need to conduct a feedback for the successfully received data packet, thereby avoiding a waste of resources and improving the throughput of the communication system.

In an embodiment of the present disclosure, the transmitting module 23 is further configured to transmit the NACK information to the base station on the first time-frequency resource indicated by the second information if the receiving module 21 receives second information transmitted by the base station in a preset time period from a time when the first information is transmitted by the transmitting module 23 to the base station.

In an embodiment of the present disclosure, the transmitting module 23 is further configured to transmit the NACK information to the base station on the second time-frequency resource if the receiving module 21 does not receive the second information in the preset time period from a time when the first information is transmitted by the transmitting module 23 to the base station; where the second time-frequency resource is a time-frequency resource allocated by the base station, for transmitting feedback information, to the terminal device before the receiving module receives the data packet, where the second time-frequency resource is a plurality of time-frequency resources, and the time interval between two adjacent time-frequency resources in the plurality of time-frequency resources is a preset value.

In an embodiment of the present disclosure, the first information is uplink scheduling request (SR) information, and the second information is an uplink grant (UL Grant) signaling; alternatively the first information is uplink scheduling request (SR) information, and the second information is a radio resource control (RRC) signaling.

As for the terminal device according to the embodiment of the present disclosure, reference may be made to the process of the method 200 for transmitting feedback information according to the embodiment of the present disclosure, and each unit/module in the terminal device and the other operations and/or functions described above are respectively for the implementation of the method 200, which will not be repeated herein for the sake of brevity.

Figure 10:
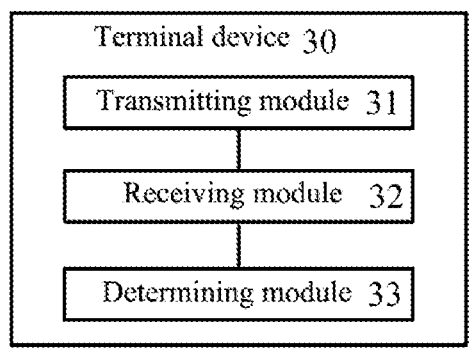
FIG. 10 is a schematic block diagram of a terminal device according to yet another embodiment of the present disclosure.

FIG. 10 is a schematic block diagram of a terminal device according to yet another embodiment of the present disclosure, as shown in FIG. 10, the terminal device 30 includes:

a transmitting module 31, configured to transmit a plurality of data packets to a base station;

a receiving module 32, configured to receive feedback information transmitted by the base station when the base station determines that there is an unsuccessfully received data packet in the plurality of data packets, where the feedback information is configured for feeding back receiving status of the plurality of data packets, and the feedback information includes only negative acknowledgement (NACK) information for negatively acknowledging the unsuccessfully received data packet; and a determining module 33, configured to determine the unsuccessfully received data packet according to the NACK information;

the transmitting module 32 is further configured to retransmit the unsuccessfully received data packet to the base station.

Therefore, according to the embodiment of the present disclosure the feedback information received by the terminal device from the base station is transmitted by the base station when the base station determines that there is an unsuccessfully received data packet in the plurality of data packets transmitted by the terminal device, and the feedback information includes only NACK information for negatively acknowledging the unsuccessfully received data packet. Therefore, the base station does not need to transmit specialized acknowledgement information to the base station for a successfully received data packet, thereby avoiding a waste of resources and improving the throughput of the communication system.

In an embodiment of the present disclosure, the NACK information carries the identification information, where the identification information is index information of a radio frame and a subframe that are occupied by the base station when receiving the unsuccessfully received data packet, or the identification information is a serial number of the unsuccessfully received data packet;

Where in the aspect of determining the unsuccessfully received data packet according to the NACK information, the determining module 33 is specifically configured to: determine the unsuccessfully received data packet according to the identification information.

In an embodiment of the present disclosure, in the aspect of receiving feedback information transmitted by the base station when the base station determines that there is an unsuccessfully received data packet in the plurality of data packets, the receiving module is specifically configured to receive the downlink control channel transmitted by the base station, where the downlink control channel only carries the feedback information; alternatively, receive the downlink control channel transmitted by the base station, where the downlink control channel carries the feedback information and the downlink control signaling.

As for the terminal device according to the embodiment of the present disclosure, reference may be made to the process of the method 300 for transmitting feedback information according to the embodiment of the present disclosure, and each unit/module in the terminal device and the other operations and/or functions described above are respectively for the implementation of the method 300, which will not be repeated herein for the sake of brevity.

Figure 11:
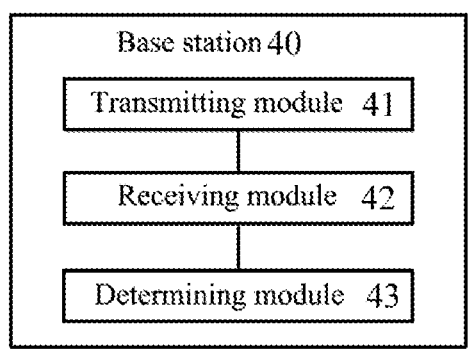
FIG. 11 is a schematic block diagram of a base station according to an embodiment of the present disclosure.

The terminal device according to an embodiment of the present disclosure is described in detail above with reference to FIG. 8 to FIG. 10. And a base station according to an embodiment of the present disclosure will be described in detail below with reference to FIG. 11 to FIG. 13. FIG. 11 shows a base station according to an embodiment of the present disclosure, as shown in FIG. 11, the base station 40 includes:

a transmitting module 41, configured to transmit a plurality of data packets to the terminal device.

a receiving module 42, configured to receive first feedback information which is transmitted by the terminal device when the terminal device determines that there is an unsuccessfully received data packet in the plurality of data packets, where the first feedback information is configured for feeding back receiving status of the plurality of data packets, and the first feedback information includes only negative acknowledgement (NACK) information for negatively acknowledging the unsuccessfully received data packet;

a determining module 43, configured to determine the unsuccessfully received data packet according to the NACK information;

the transmitting module 41 is further configured to retransmit the unsuccessfully received data packet to the terminal device.

Therefore, after transmitting the plurality of data packets to the terminal device, the base station according to the embodiment of the present disclosure receives the first feedback information transmitted by the terminal device, where the first feedback information includes only NACK information for negatively acknowledging an unsuccessfully received data packet in the plurality of data packets. Therefore, the base station does not receive specialized acknowledgement information transmitted by the terminal device for a successfully received data packet, thereby avoiding a waste of resources and improving the throughput of the communication system.

In an embodiment of the present disclosure, the NACK information carries the identification information, where the identification information is index information of a radio frame and a subframe that are occupied by the terminal device when receiving the unsuccessfully received data packet, or the identification information is a serial number of the unsuccessfully received data packet, Where in the aspect of determining the unsuccessfully received data packet according to the NACK information, the determining module 43 is specifically configured to: determine the unsuccessfully received data packet according to the identification information.

In an embodiment of the present disclosure, before the transmitting module 41 transmits the plurality of data packets to the terminal device, the transmitting module 41 is further configured to transmit the first information to the terminal device, where the first information is configured for indicating the first time-frequency resource allocated by the base station to the terminal device for transmitting feedback information; where in the aspect of receiving first feedback information which is transmitted by the terminal device when the terminal device determines that there is an unsuccessfully received data packet in the plurality of data packets, the receiving module 42 is specifically configured to receive the first feedback information on the first time-frequency resource.

In an embodiment of the present disclosure, the transmitting module 41 is further configured to transmit second information to the terminal device, where the second information is configured for indicating the terminal device to feed back receiving status of the plurality of data packets to the base station using a first manner or a second manner when each data packet in the plurality of data packets is successfully received; where the first manner is to transmit second feedback information to the base station on the first time-frequency resource, where the second feedback information includes acknowledgement (ACK) information, and the ACK information is configured for indicating that each data packet in the plurality of data packets is successfully received by the terminal device; the second manner is to not transmit feedback information to the base station on the first time-frequency resource.

In an embodiment of the present disclosure, the first time-frequency resource is a plurality of time-frequency resources, and a time interval between two adjacent time-frequency resources of the plurality of time-frequency resources is a first preset value.

In an embodiment of the present disclosure, the receiving module 42 is further configured to: receive third information transmitted by the terminal device, where the third information is configured for requesting the base station to allocate, to the terminal device, time-frequency resource for transmitting the first feedback information;

where in the aspect of receiving the first feedback information transmitted by the terminal device when the terminal device determines that there is an unsuccessfully received data packet in the plurality of data packets, the receiving module 42 is specifically configured to receive the first feedback information on the second time-frequency resource indicated by the fourth information if the transmitting module 41 transmits the fourth information to the terminal device in a preset time period from a time when the third information is received by the receiving module 42.

In an embodiment of the present disclosure, the receiving module 42 is further configured to: receive the first feedback information on the third time-frequency resource if the transmitting module 41 does not transmit the fourth information to the terminal device in the preset time period from a time when the third information is received by the receiving module 42. where the third time-frequency resource is a time-frequency resource allocated by the base station, for transmitting feedback information, to the terminal device before the base station transmits the plurality of data packets to the terminal device, where the third time-frequency resource is a plurality of time-frequency resources, and the time interval between two adjacent time-frequency resources of the plurality of time-frequency resources is a second preset value.

In an embodiment of the present disclosure, the third information is uplink scheduling request (SR) information, and the fourth information is an uplink grant (UL Grant) signaling; alternatively the thirdly information is uplink scheduling request (SR) information, and the fourth information is a radio resource control (RRC) signaling.

In an embodiment of the present disclosure, before the transmitting module 41 transmits the plurality of data packets to the terminal device, the transmitting module 41 is further configured to transmit fifth information to the terminal device, where the fifth information is configured for indicating a feedback manner in which the terminal device feeds back receiving status of the plurality of data packets;

where the first feedback information is transmitted to the base station when the fifth information indicates the terminal device to adopt a target feedback manner, where the target feedback manner is that the terminal device transmits, to the base station, the feedback information including only the NACK information for negatively acknowledging the unsuccessfully received data packet in case that the terminal device determines that there is unsuccessfully received data packet.

In an embodiment of the present disclosure, in the aspect of transmitting the fifth information to the terminal device, the transmitting module 41 is specifically configured to transmit an uplink grant (UL Grant) signaling to the terminal device, where the UL grant signaling carries the fifth information; or, transmit a downlink grant (DL Grant) signaling to the terminal device, where the DL grant signaling carries the fifth information; or, transmit a radio resource control (RRC) signaling to the terminal device, where the RRC signaling carries the fifth information.

As for the base station according to the embodiment of the present disclosure, reference may be made to the process of the method 100 for transmitting feedback information according to the embodiment of the present disclosure, and each unit/module in the base station and the other operations and/or functions described above are respectively for the implementation of the method 100, which will not be repeated herein for the sake of brevity.

Figure 12:
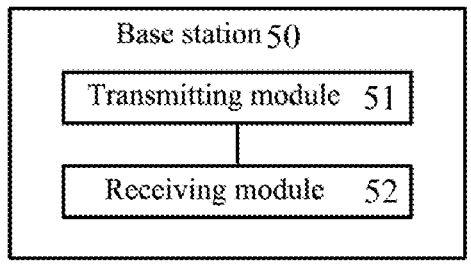
FIG. 12 is a schematic block diagram of a base station according to another embodiment of the present disclosure.

FIG. 12 shows a base station according to another embodiment of the present disclosure, as shown in FIG. 12, the base station 50 includes:

a transmitting module 51, configured to transmit a data packet to a terminal device;

a receiving module 52, configured to receive first information transmitted by the terminal device when the terminal device determines that the data packet is unsuccessfully received, where the first information is configured for requesting the base station to allocate, to the terminal device, a time-frequency resource for transmitting negative acknowledgement (NACK) information, and the NACK information is configured for negatively acknowledging the data packet.

Therefore, the first information transmitted by the terminal device, which is then received by the base station according to the base station of the present disclosure and configured for requesting the allocation of the time-frequency resource for transmitting the NACK information, is transmitted in a case that the terminal device determines that the data packet transmitted by the base station is unsuccessfully received by terminal device. Therefore, the base station does not need to allocate time-frequency resources, for transmitting NACK information, to the terminal device in advance, thereby avoiding waste of resources and improving throughput of the communication system.

In an embodiment of the present disclosure, the receiving module 52 is further configured to: receive the NACK information on the first time-frequency resource indicated by the second information if the transmitting module transmits the second information to the terminal device in a preset time period from a time when the first information is received by the receiving module.

In an embodiment of the present disclosure, the receiving module 52 is further configured to: receive the NACK information on the second time-frequency resource if the transmitting module 51 does not transmit the second information to the terminal device in the preset time period from the time when the first information is received by the receiving module 52. Where the second time-frequency resource is a time-frequency resource allocated by the transmitting module 51, for transmitting the feedback information, to the terminal device before the base station transmits the data packet to the terminal device, where the second time-frequency resource is a plurality of time-frequency resources, and the time interval between two adjacent time-frequency resources of the plurality of time-frequency resources is a preset value.

In an embodiment of the present disclosure, the first information is uplink scheduling request (SR) information, and the second information is an uplink grant (UL Grant) signaling; alternatively the first information is uplink scheduling request (SR) information, and the second information is a radio resource control (RRC) signaling.

As for the base station according to the embodiment of the present disclosure, reference may be made to the process of the method 200 for transmitting feedback information according to the embodiment of the present disclosure, and each unit/module in the base station and the other operations and/or functions described above are respectively for the implementation of the method 200, which will not be repeated herein for the sake of brevity.

Figure 13:
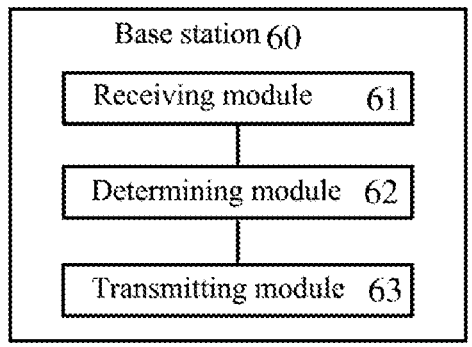
FIG. 13 is a schematic block diagram of a base station according to yet another embodiment of the present disclosure.

FIG. 13 shows a base station according to yet another embodiment of the present disclosure. As shown in FIG. 13, the base station 60 includes:

a receiving module 61, configured to receive a plurality of data packets transmitted by a terminal device;

a determining module 62, configured to determine whether there is an unsuccessfully received data packet in the plurality of data packets;

a transmitting module 63, configured to transmit feedback information to the terminal device if the determining module 62 determines that there is an unsuccessfully received data packet in the plurality of data packets, where the feedback information is configured for feeding back receiving status of the plurality of data packets, and the feedback information includes only negative acknowledgement (NACK) information for negatively acknowledging the unsuccessfully received data packet.

Therefore, the base station according to the embodiment of the present disclosure transmits feedback information to the terminal device when determining that there is an unsuccessfully received data packet in the plurality of data packets transmitted by the terminal device, where the feedback information is configured for feeding back receiving status of the plurality of data packets, and the feedback information includes only NACK information for negatively acknowledging the unsuccessfully received data packet. Therefore, the base station does not need to transmit specialized acknowledgement information to the base station for a successfully received data packet, thereby avoiding a waste of resources and improving the throughput of the communication system.

In an embodiment of the present disclosure, the NACK information carries the identification information, where the identification information is used by the terminal device to determine, according to the identification information, the unsuccessfully received data packet; where the identification information is index information of a radio frame and a subframe that are occupied by the receiving module when receiving the unsuccessfully received data packet, or the identification information is a serial number of the unsuccessfully received data packet.

In an embodiment of the present disclosure, in the aspect of transmitting the feedback information to the terminal device, the transmitting module 41 is specifically configured to transmit the downlink control channel to the terminal device, where the downlink control channel only carries the feedback information; alternatively, transmit the downlink control channel to the terminal device, where the downlink control channel carries the feedback information and the downlink control signaling.

As for the base station according to the embodiment of the present disclosure, reference may be made to the process of the method 300 for transmitting feedback information according to the embodiment of the present disclosure, and each unit/module in the base station and the other operations and/or functions described above are respectively for the implementation of the method 300, which will not be repeated herein for the sake of brevity.

Figure 14:
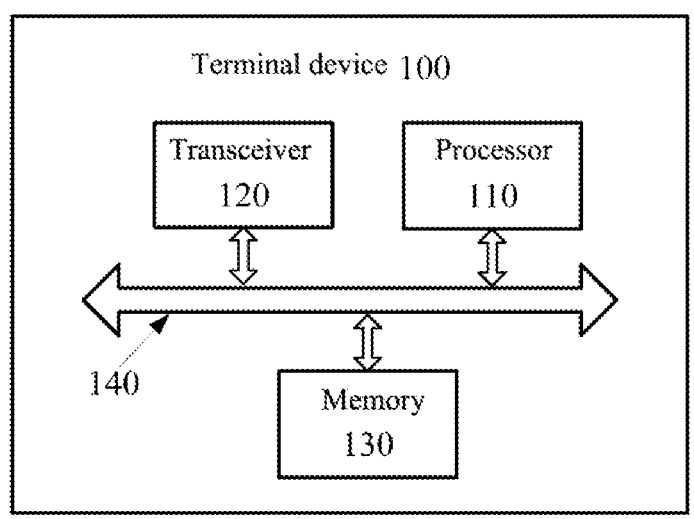
FIG. 14 is a schematic block diagram of a terminal device according to yet another embodiment of the present disclosure.

FIG. 14 shows a terminal device according to yet another embodiment of the present disclosure, as shown in FIG. 14, the terminal device 100 includes a processor 110 and a transceiver 120, where the processor 110 is connected to the transceiver 120. In an embodiment, the terminal device 100 further includes a memory 130, and the memory 130 is connected to the processor 110. Further, the terminal device 100 includes a bus system 140. Where the processor 110, the memory 130, and the transceiver 120 may be connected by a bus system 140. The memory 130 may be configured to store instructions, and the processor 110 is configured to execute the instructions stored in the memory 130 to control the transceiver 120 to transmit information or receive information.

It should be understood that, in an embodiment of the present disclosure, the processor 110 may be a central processing unit (CPU), or the processor 110 may also be other universal processors, a digital signal processors (DSP), an application specific integrated circuit (ASIC), a field programmable gate array (FPGA) or other programmable logic device, a discrete gate, a transistor logic device, a discrete hardware component, or the like. The universal processor may be a microprocessor or the processor may be any conventional processor or the like.

The memory 130 may include a read only memory and a random access memory, and provides instructions and data to the processor 110. A portion of the memory 130 may also include a non-volatile random access memory. For example, the memory 130 may also store information of the type of the device.

The bus system 130 may include a power bus, a control bus, a state signal bus, and the like in addition to the data bus. However, for clarity of description, various buses are labeled as the bus system 130 in the figures.

In the implementation process, each step of the foregoing method may be completed by an integrated logic circuit of hardware in the processor 110 or an instruction in the form of software. The steps of the method disclosed in conjunction with the embodiments of the present disclosure may be directly implemented by a hardware processor, or may be implemented by a combination of hardware and software modules in the processor. The software module can be located in a mature storage medium of the prior art such as a random access memory, a flash memory, a read only memory, a programmable read only memory or an electrically erasable programmable memory, a register, and the like. The storage medium is located in the memory 130. The processor 110 reads the information in the memory 130 and completes the steps of the above method in conjunction with its hardware. To avoid repetition, it will not be described in detail herein.

Where, the transceiver 120 is configured to receive a plurality of data packets transmitted by the base station;

the processor 110 is configured to determine whether there is an unsuccessfully received data packet in the plurality of data packets;

and the transceiver is further configured to transmit first feedback information to the base station if the processor 110 determines that there is an unsuccessfully received data packet in the plurality of data packets, where the first feedback information is configured for feeding back the receiving status of the plurality of data packets, and the first feedback information includes only negative acknowledgement (NACK) information for negatively acknowledging the unsuccessfully received data packet.

In an embodiment, the NACK information carries the identification information, where the identification information is used by the base station to determine, according to the identification information, the unsuccessfully received data packet; where the identification information is index information of a radio frame and a subframe that are occupied by the receiving module when receiving the unsuccessfully received data packet, or the identification information is a serial number of the unsuccessfully received data packet.

In an embodiment, before the transceiver 120 receives the plurality of data packets transmitted by the base station, the transceiver 120 is further configured to receive the first information transmitted by the base station, where the first information is configured for indicating the first time-frequency resource allocated by the base station to the terminal device for transmitting feedback information; where in the aspect of transmitting the first information to the base station, the transceiver 120 is specifically configured to: transmit the first feedback information to the base station on the first time-frequency resource.

In an embodiment, the transceiver 120 is further configured to: receive second information transmitted by the base station, where the second information is configured for indicating the terminal device to feed back receiving status of the plurality of data packets to the base station using a first manner or a second manner when each data packet in the plurality of data packets is successfully received by the transceiver 120; where the first manner is to transmit second feedback information to the base station on the first time-frequency resource, where the second feedback information includes acknowledgement (ACK) information, and the ACK information is configured for indicating that each data packet in the plurality of data packets is successfully received by the terminal device; the second manner is to not transmit feedback information to the base station on the first time-frequency resource.

In an embodiment, the first time-frequency resource is a plurality of time-frequency resources, and a time interval between two adjacent time-frequency resources of the plurality of time-frequency resources is a first preset value.

In an embodiment, the transceiver 120 is further configured to transmit third information to the base station, where the third information is configured for requesting the base station to allocate, to the terminal device, time-frequency resource for transmitting the first feedback information;

where in the aspect of transmitting the first information to the base station, the transceiver 120 is configured to: transmit the first feedback information to the base station on the second time-frequency resource indicated by the fourth information if the transceiver 120 receives fourth information transmitted by the base station in a preset time period from a time when the third information is transmitted to the base station.

In an embodiment, the transceiver 120 is further configured to: transmit the first feedback information to the base station on the third time-frequency resource if the transceiver 120 does not receive the fourth information in the preset time period from a time when the third information is transmitted to the base station; where the third time-frequency resource is a time-frequency resource allocated by the base station, for transmitting feedback information, to the terminal device before the transceiver 120 receives the plurality of data packets transmitted by the base station, where the third time-frequency resource is a plurality of time-frequency resources, and the time interval between two adjacent time-frequency resources of the plurality of time-frequency resources is a second preset value.

In an embodiment, the third information is uplink scheduling request (SR) information, and the fourth information is an uplink grant (UL Grant) signaling; alternatively the thirdly information is uplink scheduling request (SR) information, and the fourth information is a radio resource control (RRC) signaling.

In an embodiment, before the transceiver 120 receives the plurality of data packets transmitted by the base station, the transceiver 120 is further configured to receive fifth information transmitted by the base station, where the fifth information is configured for indicating a feedback manner in which the terminal device feeds back receiving status of the plurality of data packets;

where in the aspect of transmitting the first information to the base station, the transceiver 120 is specifically configured to: transmit the first feedback information to the base station when the fifth information indicates the terminal device to adopt a target feedback manner, where the target feedback manner is that the terminal device transmits, to the base station, the feedback information including only the NACK information for negatively acknowledging the unsuccessfully received data packet in case that the terminal device determines that there is unsuccessfully received data packet.

In an embodiment, in the aspect of receiving the fifth information transmitted by the base station, the transceiver 120 is specifically configured to receive an uplink grant (UL Grant) signaling transmitted by the base station, where the UL grant signaling carries the fifth information; or, receive a downlink grant (DL Grant) signaling transmitted by the base station, where the DL grant signaling carries the fifth information; or, receive a radio resource control (RRC) signaling transmitted by the base station, where the RRC signaling carries the fifth information.

The terminal device according to an embodiment of the present disclosure may correspond to a terminal device in the method 100 of the embodiment of the present disclosure, and each unit and module in the terminal device and the other operations and/or functions described above are respectively for the implementation of the corresponding process in the method 100, which will not be repeated herein for the sake of brevity.

The terminal device according to the embodiment of the present disclosure transmits the first feedback information to the base station when determining that there is an unsuccessfully received data packet in the plurality of data packets transmitted by the base station, and the first feedback information includes only NACK information for negatively acknowledging the unsuccessfully received data packet. Therefore, the terminal device does not need to transmit specialized acknowledgement information to the base station for a successfully received data packet, thereby avoiding a waste of resources and improving the throughput of the communication system.

Alternatively, the transceiver 120 is configured to receive a packet transmitted by the base station;

the processor 110 is configured to determine whether the transceiver 120 successfully receives the data packet.

The transceiver 120 is further configured to transmit the first information to the base station if the processor 110 determines that the data packet is unsuccessfully received by the transceiver 120, where the first information is configured for requesting the base station to allocate, to the terminal device, a time-frequency resource for transmitting negative acknowledgement (NACK) information, and the NACK information is configured for negatively acknowledging the data packet.

In an embodiment, the transceiver 120 is further configured to: transmit the NACK information to the base station on the first time-frequency resource indicated by the second information if the transceiver 120 receives second information transmitted by the base station in a preset time period from a time when the first information is transmitted to the base station.

In an embodiment, the transceiver 120 is further configured to: transmit the NACK information to the base station on the second time-frequency resource if the transceiver 120 does not receive the second information in the preset time period from a time when the first information is transmitted to the base station; where the second time-frequency resource is a time-frequency resource allocated by the base station, for transmitting feedback information, to the terminal device before the transceiver 120 receives the data packet, where the second time-frequency resource is a plurality of time-frequency resources, and the time interval between two adjacent time-frequency resources in the plurality of time-frequency resources is a preset value.

In an embodiment, the first information is uplink scheduling request (SR) information, and the second information is an uplink grant (UL Grant) signaling; alternatively the first information is uplink scheduling request (SR) information, and the second information is a radio resource control (RRC) signaling.

The terminal device according to an embodiment of the present disclosure may correspond to a terminal device in the method 200 of the embodiment of the present disclosure, and each unit and module in the terminal device and the other operations and/or functions described above are respectively for the implementation of the corresponding process in the method 200, which will not be repeated herein for the sake of brevity.

When determining that the data packet transmitted by the base station is not successfully received, the terminal device according to the embodiment of the present disclosure applies to the base station for a time-frequency resource for transmitting NACK information for negatively acknowledging the data packet. Therefore, the base station may not need to allocate the time-frequency resource, for transmitting the NACK information, to the terminal device in advance, and the terminal device does not need to conduct a feedback for the successfully received data packet, thereby avoiding a waste of resources and improving the throughput of the communication system.

Alternatively, the transceiver 120 is configured to transmit a plurality of packets to the base station;

the transceiver 120 is further configured to receive feedback information transmitted by the base station when the base station determines that there is an unsuccessfully received data packet in the plurality of data packets, where the feedback information is configured for feeding back receiving status of the plurality of data packets, and the feedback information includes only negative acknowledgement (NACK) information for negatively acknowledging the unsuccessfully received data packet;

the processor 110 is configured to determine the unsuccessfully received data packet according to the NACK information;

the transceiver 120 is further configured to receive feedback information transmitted by the base station when the base station determines that there is an unsuccessfully received data packet in the plurality of data packets.

In an embodiment, the NACK information carries the identification information, where the identification information is index information of a radio frame and a subframe that are occupied by the base station when receiving the unsuccessfully received data packet, or the identification information is a serial number of the unsuccessfully received data packet.

Where, in the aspect of determining the unsuccessfully received data packet according to the NACK information, the processor 110 is specifically configured to: determine the unsuccessfully received data packet according to the identification information.

In an embodiment, in the aspect of receiving feedback information transmitted by the base station when the base station determines that there is an unsuccessfully received data packet in the plurality of data packets, the transceiver 120 is specifically configured to receive the downlink control channel transmitted by the base station, where the downlink control channel only carries the feedback information; alternatively, receive the downlink control channel transmitted by the base station, where the downlink control channel carries the feedback information and the downlink control signaling.

The terminal device according to an embodiment of the present disclosure may correspond to a terminal device in the method 300 of the embodiment of the present disclosure, and each unit and module in the terminal device and the other operations and/or functions described above are respectively for the implementation of the corresponding process in the method 300, which will not be repeated herein for the sake of brevity.

According to the embodiment of the present disclosure the feedback information received by the terminal device from the base station is transmitted by the base station when the base station determines that there is an unsuccessfully received data packet in the plurality of data packets transmitted by the terminal device, and the feedback information includes only NACK information for negatively acknowledging the unsuccessfully received data packet. Therefore, the base station does not need to transmit specialized acknowledgement information to the base station for a successfully received data packet, thereby avoiding a waste of resources and improving the throughput of the communication system.

Figure 15:
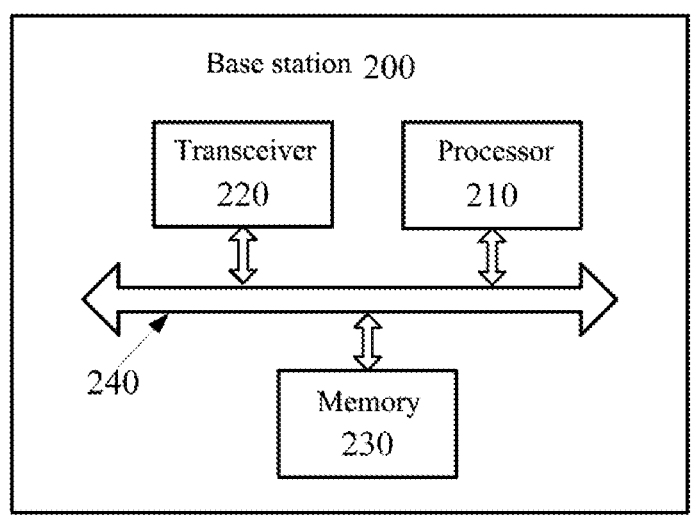
FIG. 15 is a schematic block diagram of a base station according to yet another embodiment of the present disclosure.

FIG. 15 is a schematic block diagram of a base station according to yet another embodiment of the present disclosure; as shown in FIG. 15, the base station 200 includes a processor 210 and a transceiver 220, where the processor 210 is connected to the transceiver 220. In an embodiment, the base station 200 further includes a memory 230, and the memory 230 is connected to the processor 210. Further, the base station 200 includes a bus system 240. Where the processor 210, the memory 230, and the transceiver 220 may be connected by a bus system 240. The memory 230 may be configured to store instructions, and the processor 210 is configured to execute the instructions stored in the memory 230 to control the transceiver 220 to transmit information or receive information.

It should be understood that, in an embodiment of the present disclosure, the processor 210 may be a central processing unit (CPU), or the processor 210 may also be other universal processors, a digital signal processors (DSP), an application specific integrated circuit (ASIC), a field programmable gate array (FPGA) or other programmable logic device, a discrete gate, a transistor logic device, a discrete hardware component, or the like. The universal processor may be a microprocessor or the processor may be any conventional processor or the like.

The memory 230 may include a read only memory and a random access memory, and provides instructions and data to the processor 210. A portion of the memory 230 may also include a non-volatile random access memory. For example, the memory 230 may also store information of the type of the device.

The bus system 240 may include a power bus, a control bus, a state signal bus, and the like in addition to the data bus. However, for clarity of description, various buses are labeled as the bus system 240 in the figures.

In the implementation process, each step of the foregoing method may be completed by an integrated logic circuit of hardware in the processor 210 or an instruction in the form of software. The steps of the method disclosed in conjunction with the embodiments of the present disclosure may be directly implemented by a hardware processor, or may be implemented by a combination of hardware and software modules in the processor. The software module can be located in a mature storage medium of the prior art such as a random access memory, a flash memory, a read only memory, a programmable read only memory or an electrically erasable programmable memory, a register, and the like. The storage medium is located in the memory 230. The processor 210 reads the information in the memory 230 and completes the steps of the above method in conjunction with its hardware. To avoid repetition, it will not be described in detail herein.

Where the transceiver 220 is configured to transmit a plurality of data packets to the terminal device.

The transceiver 220 is further configured to receive first feedback information which is transmitted by the terminal device when the terminal device determines that there is an unsuccessfully received data packet in the plurality of data packets, where the first feedback information is configured for feeding back receiving status of the plurality of data packets, and the first feedback information includes only negative acknowledgement (NACK) information for negatively acknowledging the unsuccessfully received data packet;

the processor 210 is configured to determine the unsuccessfully received data packet according to the NACK information;

the transceiver 220 is further configured to retransmit the unsuccessfully received data packet to the terminal device.

In an embodiment, the NACK information carries the identification information, where the identification information is index information of a radio frame and a subframe that are occupied by the terminal device when receiving the unsuccessfully received data packet, or the identification information is a serial number of the unsuccessfully received data packet, where in the aspect of determining the unsuccessfully received data packet according to the NACK information, the processor 210 is specifically configured to: determine the unsuccessfully received data packet according to the identification information.

In an embodiment, before the transceiver 220 transmits a plurality of data packets to the terminal device, the transceiver 220 is further configured to: transmit the first information to the terminal device, where the first information is configured for indicating the first time-frequency resource allocated by the base station to the terminal device for transmitting feedback information; where in the aspect of receiving first feedback information which is transmitted by the terminal device when the terminal device determines that there is an unsuccessfully received data packet in the plurality of data packets, the transceiver 220 is specifically configured to receive the first feedback information on the first time-frequency resource.

In an embodiment, the transceiver 220 is further configured to: transmit second information to the terminal device, where the second information is configured for indicating the terminal device to feed back receiving status of the plurality of data packets to the base station using a first manner or a second manner when each data packet in the plurality of data packets is successfully received; where the first manner is to transmit second feedback information to the base station on the first time-frequency resource, where the second feedback information includes acknowledgement (ACK) information, and the ACK information is configured for indicating that each data packet in the plurality of data packets is successfully received by the terminal device; the second manner is to not transmit feedback information to the base station on the first time-frequency resource.

In an embodiment, the first time-frequency resource is a plurality of time-frequency resources, and a time interval between two adjacent time-frequency resources of the plurality of time-frequency resources is a first preset value.

In an embodiment, the transceiver 220 is further configured to: receive third information transmitted by the terminal device, where the third information is configured for requesting the base station to allocate, to the terminal device, time-frequency resource for transmitting the first feedback information; where in the aspect of receiving the first feedback information transmitted by the terminal device when the terminal device determines that there is an unsuccessfully received data packet in the plurality of data packets, the transceiver 220 is specifically configured to receive the first feedback information on the second time-frequency resource indicated by the fourth information if the transceiver 220 transmits the fourth information to the terminal device in a preset time period from a time when the third information is received.

In an embodiment, the transceiver 220 is further configured to: receive the first feedback information on the third time-frequency resource if the transceiver 220 does not transmit the fourth information to the terminal device in the preset time period from a time when the third information is received, where the third time-frequency resource is a time-frequency resource allocated by the base station, for transmitting feedback information, to the terminal device before the base station transmits the plurality of data packets to the terminal device, where the third time-frequency resource is a plurality of time-frequency resources, and the time interval between two adjacent time-frequency resources of the plurality of time-frequency resources is a second preset value.

In an embodiment, the third information is uplink scheduling request (SR) information, and the fourth information is an uplink grant (UL Grant) signaling; alternatively the thirdly information is uplink scheduling request (SR) information, and the fourth information is a radio resource control (RRC) signaling.

In an embodiment, before the transceiver 220 transmits a plurality of data packets to the terminal device, the transceiver 220 is further configured to: transmit fifth information to the terminal device, where the fifth information is configured for indicating a feedback manner in which the terminal device feeds back receiving status of the plurality of data packets; where the first feedback information is transmitted to the base station when the fifth information indicates the terminal device to adopt a target feedback manner, where the target feedback manner is that the terminal device transmits, to the base station, the feedback information including only the NACK information for negatively acknowledging the unsuccessfully received data packet in case that the terminal device determines that there is unsuccessfully received data packet.

In an embodiment, in the aspect of transmitting the fifth information to the terminal device, the transceiver 220 is specifically configured to: transmit an uplink grant (UL Grant) signaling to the terminal device, where the UL grant signaling carries the fifth information; or, transmit a downlink grant (DL Grant) signaling to the terminal device, where the DL grant signaling carries the fifth information; or, transmit a radio resource control (RRC) signaling to the terminal device, where the RRC signaling carries the fifth information.

The base station according to an embodiment of the present disclosure may correspond to a base station in the method 100 of the embodiment of the present disclosure, and each unit and module in the base station and the other operations and/or functions described above are respectively for the implementation of the corresponding process in the method 100, which will not be repeated herein for the sake of brevity.

After transmitting the plurality of data packets to the terminal device, the base station according to the embodiment of the present disclosure receives the first feedback information transmitted by the terminal device, where the first feedback information includes only NACK information for negatively acknowledging an unsuccessfully received data packet in the plurality of data packets. Therefore, the base station does not receive specialized acknowledgement information transmitted by the terminal device for a successfully received data packet, thereby avoiding a waste of resources and improving the throughput of the communication system.

Alternatively, the transceiver 220 is configured to transmit a data packet to the terminal device;

the receiving module 220 is further configured to receive first information which is transmitted by the terminal device when the terminal device determines that the data packet is not successfully received, where the first information is configured for requesting the base station to allocate, to the terminal device, a time-frequency resource for transmitting negative acknowledgement (NACK) information, and the NACK information is configured for negatively acknowledging the data packet.

In an embodiment, the transceiver 220 is further configured to: receive the NACK information on the first time-frequency resource indicated by the second information if the transceiver 220 transmits the second information to the terminal device in a preset time period from a time when the first information is received.

In an embodiment, the transceiver 220 is further configured to: receive the NACK information on the second time-frequency resource if the transceiver 220 does not transmit the second information to the terminal device in the preset time period from the time when the first information is received, where the second time-frequency resource is a time-frequency resource allocated by the transmitting module, for transmitting feedback information, to the terminal device before the base station transmits the data packet to the terminal device, where the second time-frequency resource is a plurality of time-frequency resources, and the time interval between two adjacent time-frequency resources of the plurality of time-frequency resources is a preset value.

In an embodiment, the first information is uplink scheduling request (SR) information, and the second information is an uplink grant (UL Grant) signaling; alternatively the first information is uplink scheduling request (SR) information, and the second information is a radio resource control (RRC) signaling.

The base station according to an embodiment of the present disclosure may correspond to a base station in the method 200 of the embodiment of the present disclosure, and each unit and module in the base station and the other operations and/or functions described above arc respectively for the implementation of the corresponding process in the method 200, which will not be repeated herein for the sake of brevity.

The first information transmitted by the terminal device, which is then received by the base station according to the base station of the present disclosure and configured to request the allocation of the time-frequency resource for transmitting the NACK information, is transmitted in a case that the terminal device determines that the terminal device does not successfully receive the data packet transmitted by the base station. Therefore, the base station does not need to allocate time-frequency resources, for transmitting NACK information, to the terminal device in advance, thereby avoiding waste of resources and improving throughput of the communication system.

Alternatively, the transceiver 220 is configured to receive the plurality of data packets transmitted by the terminal device;

the processor 210 is configured to determine whether there is an unsuccessfully received data packet in the plurality of data packets;

and the transceiver 220 is configured to transmit feedback information to the terminal device if the processor 210 determines that there is an unsuccessfully received data packet in the plurality of data packets, where the feedback information is configured for feeding back receiving status of the plurality of data packets, and the feedback information includes only negative acknowledgement (NACK) information for negatively acknowledging the unsuccessfully received data packet.

In an embodiment, the NACK information carries identification information, where the identification information is used by the terminal device to determine, according to the identification information, the unsuccessfully received data packet; where the identification information is index information of a radio frame and a subframe that are occupied by the transceiver 220 when receiving the unsuccessfully received data packet, or the identification information is a serial number of the unsuccessfully received data packet.

In an embodiment, in the aspect of transmitting the feedback information to the terminal device, the transceiver 220 is specifically configured to: transmit the downlink control channel to the terminal device, where the downlink control channel only carries the feedback information; alternatively, transmit the downlink control channel to the terminal device, where the downlink control channel carries the feedback information and the downlink control signaling.

The base station according to an embodiment of the present disclosure may correspond to a base station in the method 300 of the embodiment of the present disclosure, and each unit and module in the base station and the other operations and/or functions described above are respectively for the implementation of the corresponding process in the method 300, which will not be repeated herein for the sake of brevity.

The base station according to the embodiment of the present disclosure transmits feedback information to the terminal device when determining that there is an unsuccessfully received data packet in the plurality of data packets transmitted by the terminal device, where the feedback information is configured for feeding back the receiving status of the plurality of data packets, and the and feedback information includes only NACK information for negatively acknowledging the unsuccessfully received data packet. Therefore, the base station does not need to transmit specialized acknowledgement information to the base station for a successfully received data packet, thereby avoiding a waste of resources and improving the throughput of the communication system.

It is to be understood that the phrase "one embodiment" or "an embodiment" referred to throughout the description means particular features, structures or characteristics related to the embodiment are included in at least one embodiment of the present disclosure. Thus, "in one embodiment" or "in an embodiment" appearing throughout the description does not necessarily refers to a same embodiment. In addition, these particular features, structures, or characteristics may be combined in any proper manner in one or more embodiments.

It should be understood that the term "and/or" herein is merely an association relationship describing an associated object, indicating that there may be three relationships, for example, A and/or B, which may indicate that A exists separately, A and B exist simultaneously, and B exists separately. In addition, the character "/" herein generally indicates that the relationship of contextually associated objects is an "or" relationship.

It should be understood that, in various embodiments of the present disclosure, the size of the sequence numbers of the above processes does not mean the order of execution, and the order of execution of each process should be determined by its function and internal logic, and should not be taken as a limitation to the embodiments of the present disclosure.

Those skilled in the art will appreciate that the various method steps and elements described in conjunction with the embodiments disclosed herein can be implemented in electronic hardware, computer software, or a combination of both. To clearly illustrate the interchangeability of hardware and software, the steps and components of the various embodiments have been described generally in terms of functions in the foregoing description. Whether these functions are performed in hardware or software depends on the specific application and design constraints of the solution. Different methods may be used to implement the described functions for each particular application, but such implementation should not be considered to be beyond the scope of the present disclosure.

The methods or steps described in conjunction with the embodiments disclosed herein may be software programs implemented by hardware, or by processor, or by a combination of both. The software program can be placed in random access memory (RAM), memory, read-only memory (ROM), electrically programmable read-only memory (EPROM), electrically erasable programmable read-only memory (EEPROM), register, hard disk, removable disk, compact disc read-only memory (CD-ROM), or any other form of storage medium as known in the art.

In the several embodiments provided by the present application, it should be understood that the disclosed systems, devices, and methods may be implemented in other manners. For example, the apparatus embodiments described above are merely illustrative. For example, the division of the unit is only a logical functional division. In actual implementation, there may be another division manner, for example, a plurality of units or components may be combined or may be integrated into another system, or some features can be ignored or not executed.

The units described as separate components may or may not be physically separated, and the components illustrated as units may or may not be physical units, that is, may be located in one place, or may be distributed to a plurality of network units. Some or all of the units may be selected according to actual needs to achieve the purpose of the solution of the present embodiment.

In addition, each functional unit in each embodiment of the present disclosure may be integrated into one processing unit, or each unit may exist physically and separately, or two or more units may be integrated into one unit.

Although the present disclosure has been described in detail by reference to the accompanying drawings, and in conjunction with the preferred embodiments, the present disclosure is not limited thereto. Various equivalent modifications and substitutions to the embodiments of the present disclosure may be made by those skilled in the art without departing from the spirit and essence of the present disclosure. Such modifications or substitutions are intended to be within the scope of the present disclosure.

The invention claimed is:

1. A method for transmitting feedback information, comprising:
   receiving, by a terminal device, a plurality of data packets transmitted by a base station;
   transmitting, by the terminal device, first feedback information to the base station if the terminal device determines that there is an unsuccessfully received data packet in the plurality of data packets, wherein the first feedback information is configured for feeding back receiving status of the plurality of data packets, and the first feedback information comprises only negative acknowledgement (NACK) information for negatively acknowledging the unsuccessfully received data packet;
   wherein the method further comprises:
   transmitting, by the terminal device, third information to the base station if the terminal device determines that there is an unsuccessfully received data packet in the plurality of data packets, wherein the third information is configured for requesting the base station to allocate, to the terminal device, time-frequency resource for transmitting the first feedback information;

wherein the transmitting, by the terminal device, first feedback information to the base station comprises:
transmitting, by the terminal device, the first feedback information to the base station on a second time-frequency resource indicated by fourth information, if the terminal device receives the fourth information transmitted by the base station in a preset time period from a time when the third information is transmitted to the base station;
transmitting, by the terminal device, the first feedback information to the base station on a plurality of third time-frequency resources if the terminal device does not receive the fourth information in the preset time period from a time when the third information is transmitted to the base station;
wherein the plurality of third time-frequency resources are time-frequency resources allocated by the base station, for transmitting feedback information, to the terminal device before the terminal device receives the plurality of data packets transmitted by the base station, wherein a time interval between two adjacent time-frequency resources of the plurality of third time-frequency resources is a second preset value;
wherein before the receiving, by a terminal device, a plurality of data packets transmitted by a base station, the method further comprises:
receiving, by the terminal device, fifth information transmitted by the base station, wherein the fifth information is configured for indicating a feedback manner in which the terminal device feeds back receiving status of the plurality of data packets;
wherein the transmitting, by the terminal device, first feedback information to the base station comprises:
transmitting, by the terminal device, the first feedback information to the base station, when the fifth information indicates the terminal device to adopt a target feedback manner, wherein the target feedback manner is that the terminal device transmits, to the base station, feedback information comprising only the NACK information for negatively acknowledging the unsuccessfully received data packet in case that the terminal device determines that there is unsuccessfully received data packet.

2. The method according to claim 1, wherein the NACK information carries identification information, wherein the identification information is used by the base station to determine, according to the identification information, the unsuccessfully received data packet;
wherein the identification information is index information of a radio frame and a subframe which are occupied by the terminal device when receiving the unsuccessfully received data packet, or the identification information is a serial number of the unsuccessfully received data packet.

3. The method according to claim 1, wherein before the receiving, by a terminal device, a plurality of data packets transmitted by a base station, the method further comprises:
receiving, by the terminal device, first information transmitted by the base station, wherein the first information is configured for indicating a first time-frequency resource allocated by the base station to the terminal device for transmitting feedback information;
wherein the transmitting, by the terminal device, first feedback information to the base station comprises:
transmitting, by the terminal device, the first feedback information to the base station on the first time-frequency resource.

4. The method according to claim 3, wherein the method further comprises:
receiving, by the terminal device, second information transmitted by the base station, wherein the second information is configured for indicating the terminal device to feed back receiving status of the plurality of data packets to the base station using a first manner or a second manner when each data packet in the plurality of data packets is successfully received;
wherein the first manner is to transmit second feedback information to the base station on the first time-frequency resource, wherein the second feedback information comprises acknowledgement (ACK) information, and the ACK information is configured for indicating that each data packet in the plurality of data packets is successfully received by the terminal device;
the second manner is to not transmit feedback information to the base station on the first time-frequency resource.

5. The method according to claim 3, wherein there are resource a plurality of first time-frequency resources, and a time interval between two adjacent time-frequency resources of the plurality of first time-frequency resources is a first preset value.

6. A method for transmitting feedback information, comprising:
transmitting, by a base station, a plurality of data packets to a terminal device;
receiving, by the base station, first feedback information transmitted by the terminal device when the terminal device determines that there is an unsuccessfully received data packet in the plurality of data packets, wherein the first feedback information is configured for feeding back receiving status of the plurality of data packets, and the first feedback information comprises only negative acknowledgement (NACK) information for negatively acknowledging the unsuccessfully received data packet;
determining, by the base station, the unsuccessfully received data packet according to the NACK information;
retransmitting, by the base station, the unsuccessfully received data packet to the terminal device;
wherein the method further comprises:
receiving, by the base station, third information transmitted by the terminal device, wherein the third information is configured for requesting the base station to allocate, to the terminal device, time-frequency resource for transmitting the first feedback information;
wherein the receiving, by the base station, first feedback information which is transmitted by the terminal device when the terminal device determines that there is an unsuccessfully received data packet in the plurality of data packets comprises:
receiving, by the base station, the first feedback information on a second time-frequency resource indicated by fourth information, if the base station transmits the fourth information to the terminal device in a preset time period from a time when the third information is received by the base station;
receiving, by the base station, the first feedback information on a plurality of third time-frequency resources if the base station does not transmit the fourth information to the terminal device in a preset time period from a time when the third information is received by the base station;

wherein the plurality of third time-frequency resources are time-frequency resources allocated by the base station, for transmitting feedback information, to the terminal device before the base station transmits the plurality of data packets to the terminal device, wherein a time interval between two adjacent time-frequency resources of the plurality of third time-frequency resources is a second preset value;

wherein before transmitting, by a base station, a plurality of data packets to a terminal device, the method further comprises:

transmitting, by the base station, fifth information to the terminal device, wherein the fifth information is configured for indicating a feedback manner in which the terminal device feeds back receiving status of the plurality of data packets;

wherein the first feedback information is transmitted to the base station when the fifth information indicates the terminal device to adopt a target feedback manner, wherein the target feedback manner is that the terminal device transmits, to the base station, feedback information comprising only the NACK information for negatively acknowledging the unsuccessfully received data packet in case that the terminal device determines that there is unsuccessfully received data packet.

7. The method according to claim 6, wherein the NACK information carries identification information, wherein the identification information is index information of a radio frame and a subframe which are occupied by the terminal device when receiving the unsuccessfully received data packet, or the identification information is a serial number of the unsuccessfully received data packet;

wherein the determining, by the base station, the unsuccessfully received data packet according to the NACK information comprises:

determining, by the base station, the unsuccessfully received data packet according to the identification information.

8. The method according to claim 6, wherein before the base station transmits the plurality of data packets to the terminal device, the method further comprises:

transmitting, by the base station, first information to the terminal device, wherein the first information is configured for indicating a first time-frequency resource allocated by the base station to the terminal device for transmitting feedback information;

wherein the receiving, by the base station, first feedback information which is transmitted by the terminal device when the terminal device determines that there is an unsuccessfully received data packet in the plurality of data packets comprises:

receiving, by the base station, the first feedback information on the first time-frequency resource.

9. The method according to claim 8, wherein the method further comprises:

transmitting, by the base station, second information to the terminal device, wherein the second information is configured for indicating the terminal device to feed back receiving status of the plurality of data packets to the base station using a first manner or a second manner when each data packet in the plurality of data packets is successfully received;

wherein the first manner is to transmit second feedback information to the base station on the first time-frequency resource, wherein the second feedback information comprises acknowledgement (ACK) information, and the ACK information is configured for indicating that each data packet in the plurality of data packets is successfully received by the terminal device; the second manner is to not transmit feedback information to the base station on the first time-frequency resource.

10. A terminal device, comprising a processor and a memory storing instructions thereon, the processor when executing the instructions, being configured to:

receive a plurality of data packets transmitted by a base station;

determine whether there is an unsuccessfully received data packet in the plurality of data packets;

transmit first feedback information to the base station if the processor determines that there is an unsuccessfully received data packet in the plurality of data packets, wherein the first feedback information is configured for feeding back receiving status of the plurality of data packets, and the first feedback information comprises only negative acknowledgement (NACK) information for negatively acknowledging the unsuccessfully received data packet;

wherein the processor is further configured to:

transmit third information to the base station if the terminal device determines that there is an unsuccessfully received data packet in the plurality of data packets, wherein the third information is configured for requesting the base station to allocate, to the terminal device, time-frequency resource for transmitting the first feedback information;

wherein in aspect of transmitting the first feedback information to the base station, the processor is configured to:

transmit the first feedback information to the base station on a second time-frequency resource indicated by fourth information, if the processor receives the fourth information transmitted by the base station in a preset time period from a time when the third information is transmitted to the base station by the processor;

transmit the first feedback information to the base station on a plurality of third time-frequency resources if the processor does not receive the fourth information in the preset time period from a time when the third information is transmitted to the base station by the processor;

wherein the plurality of third time-frequency resources are time-frequency resources allocated by the base station, for transmitting feedback information, to the terminal device before the processor receives the plurality of data packets transmitted by the base station, wherein a time interval between two adjacent time-frequency resources of the plurality of third time-frequency resources is a second preset value;

wherein before the processor receives the plurality of data packets transmitted by the base station, the processor is further configured to:

receive fifth information transmitted by the base station, wherein the fifth information is configured for indicating a feedback manner in which the terminal device feeds back receiving status of the plurality of data packets;

wherein in aspect of transmitting the first feedback information to the base station, the processor is configured to:

transmit the first feedback information to the base station, when the fifth information indicates the terminal device to adopt a target feedback manner, wherein the target feedback manner is that the terminal device transmits, to the base station, feedback information comprising only the NACK information for negatively acknowledging the unsuccessfully received data packet in case that the terminal device determines that there is unsuccessfully received data packet.

11. The terminal device according to claim 10, wherein the NACK information carries identification information, wherein the identification information is used by the base station to determine, according to the identification information, the unsuccessfully received data packet;

wherein the identification information is index information of a radio frame and a subframe which are occupied by the processor when receiving the unsuccessfully received data packet, or the identification information is a serial number of the unsuccessfully received data packet.

12. The terminal device according to claim 10, wherein before the processor receives the plurality of data packets transmitted by the base station, the processor is further configured to:

receive first information transmitted by the base station, wherein the first information is configured for indicating a first time-frequency resource allocated by the base station to the terminal device for transmitting feedback information;

wherein in aspect of transmitting the first feedback information to the base station, the processor is configured to:

transmit the first feedback information to the base station on the first time-frequency resource.

13. The terminal device according to claim 12, wherein the processor is further configured to:

receive second information transmitted by the base station, wherein the second information is configured for indicating the terminal device to feed back receiving status of the plurality of data packets to the base station using a first manner or a second manner when each data packet in the plurality of data packets is successfully received;

wherein the first manner is to transmit second feedback information to the base station on the first time-frequency resource, wherein the second feedback information comprises acknowledgement (ACK) information, and the ACK information is configured for indicating that each data packet in the plurality of data packets is successfully received by the terminal device;

the second manner is to not transmit feedback information to the base station on the first time-frequency resource.

14. The terminal device according to claim 12, wherein there are a plurality of first time-frequency resources, and a time interval between two adjacent time-frequency resources of the plurality of first time-frequency resources is a first preset value.

* * * * *